(12) United States Patent
Beardsell

(10) Patent No.: US 11,613,420 B2
(45) Date of Patent: *Mar. 28, 2023

(54) TUMBLER BOTTLE

(71) Applicant: SHAKESPHERE PRODUCTS LIMITED, Salford (GB)

(72) Inventor: Richard Beardsell, Salford (GB)

(73) Assignee: Shakesphere Products Limited

( * ) Notice: Subject to any disclaimer, the term of this patent is extended or adjusted under 35 U.S.C. 154(b) by 52 days.

This patent is subject to a terminal disclaimer.

(21) Appl. No.: 16/833,780

(22) Filed: Mar. 30, 2020

(65) Prior Publication Data

US 2020/0283217 A1 Sep. 10, 2020

Related U.S. Application Data

(63) Continuation-in-part of application No. 15/047,682, filed on Feb. 19, 2016, now Pat. No. 10,661,945.

(30) Foreign Application Priority Data

Mar. 25, 2015 (AU) ................................ 2015100381

(51) Int. Cl.
*B65D 81/32* (2006.01)
*B65D 23/04* (2006.01)
(Continued)

(52) U.S. Cl.
CPC .......... *B65D 81/3216* (2013.01); *A47J 43/27* (2013.01); *B65D 23/04* (2013.01); *B65D 23/08* (2013.01);
(Continued)

(58) Field of Classification Search
CPC .... B65D 81/3216; B65D 23/04; B65D 23/08; B65D 43/0231; B65D 47/06; B65D 2203/04; A47J 43/27
(Continued)

(56) References Cited

U.S. PATENT DOCUMENTS 1,343,299 A * 6/1920 Barrows ............ B65D 81/3283
215/6
1,744,328 A 1/1930 Morley
(Continued)

FOREIGN PATENT DOCUMENTS

CN 202516019 U 11/2012
EM 003003623-0001 3/2016
JP H01268520 A 10/1989

*Primary Examiner* — Paul R Durand
*Assistant Examiner* — Michael J. Melaragno
(74) *Attorney, Agent, or Firm* — Laubscher & Laubscher PC

(57) ABSTRACT

The tumbler bottle includes a cup having a side wall interior surface and bottom wall a convex interior surface. The cup side wall and bottom wall interior surfaces are joined by a smooth, arcuate interior transition surface to define a first mixing chamber. The tumbler bottle further includes a lid, removably connected with the cup. The lid includes a side wall interior surface and a top wall concave interior surface. The lid side wall and top wall interior surfaces are joined by a smooth, arcuate interior transition surface to define a second mixing chamber. The lid further includes a dispensing outlet and a closure. When coupled together the first mixing chamber and the second mixing chamber are in fluid communication and are configured to uniformly mix a liquid with one or more additives.

20 Claims, 22 Drawing Sheets

(51) Int. Cl.
*B65D 43/02* (2006.01)
*B65D 47/06* (2006.01)
*A47J 43/27* (2006.01)
*B65D 23/08* (2006.01)

(52) U.S. Cl.
CPC ......... *B65D 43/0231* (2013.01); *B65D 47/06* (2013.01); *B65D 2203/04* (2013.01)

(58) Field of Classification Search
USPC ..................................................... 222/144.5
See application file for complete search history.

(56) References Cited

U.S. PATENT DOCUMENTS

| | | | | |
|---|---|---|---|---|
| 1,765,129 A * | 6/1930 | Cooke | ..................... | A47J 43/27 220/568 |
| 1,969,486 A * | 8/1934 | Kurz | ..................... | A47J 43/27 220/568 |
| 2,013,615 A | 9/1935 | Fontan | | |
| D102,943 S | 1/1937 | Dulany | | |
| 2,072,433 A | 3/1937 | Solomon | | |
| D105,169 S | 6/1937 | Fuerst | | |
| 2,752,971 A * | 7/1956 | Tupper | ..................... | A47J 43/27 220/4.03 |
| 2,766,796 A * | 10/1956 | Tupper | ..................... | A47G 23/03 220/521 |
| 2,774,466 A * | 12/1956 | Liska | ..................... | B65D 47/263 206/538 |
| 2,791,467 A * | 5/1957 | Leshin | ..................... | A47J 43/27 222/143 |
| 2,859,891 A * | 11/1958 | Carkin | ..................... | A61J 9/001 215/11.3 |
| D186,424 S | 10/1959 | Oberlin | | |
| 3,282,477 A * | 11/1966 | Henchert | ............. | B65D 47/148 222/541.9 |
| 3,348,716 A * | 10/1967 | Nakata | ..................... | B65D 11/04 215/6 |
| 3,476,277 A | 11/1969 | Rownd | | |
| 3,480,168 A * | 11/1969 | Lee | ..................... | B65D 1/0276 215/372 |
| 3,820,692 A * | 6/1974 | Swett et al. | ........ | B65D 47/0895 222/547 |
| 4,288,006 A * | 9/1981 | Clover, Jr. | ........... | B65D 47/265 206/534 |
| 4,381,059 A * | 4/1983 | Schurman | ................. | A61J 7/04 116/308 |
| 4,427,123 A | 1/1984 | Komeda et al. | | |
| D274,040 S * | 5/1984 | Ridgley | ..................... | D3/203.3 |
| D279,864 S * | 7/1985 | Ridgley | ..................... | D3/203.4 |
| 4,583,667 A * | 4/1986 | Fishman | ................ | B65D 25/04 206/538 |
| 4,691,821 A * | 9/1987 | Hofmann | ................ | A47G 19/34 206/216 |
| 4,804,101 A * | 2/1989 | Heath | ..................... | A24F 23/00 206/236 |
| 4,979,629 A * | 12/1990 | Askerneese | ............. | A61J 9/001 215/11.1 |
| 5,044,512 A * | 9/1991 | Giancaspro | ........ | A47G 19/2272 220/709 |
| 5,086,926 A * | 2/1992 | Paige | ..................... | A47J 41/02 206/542 |
| 5,322,166 A * | 6/1994 | Crowther | ........... | B65D 83/0454 206/534 |
| 5,386,922 A * | 2/1995 | Jordan | ..................... | A01K 97/06 206/373 |
| 5,397,017 A * | 3/1995 | Muza | ..................... | A61J 7/0046 206/538 |
| D361,922 S | 9/1995 | Van Dyk | | |
| 5,462,101 A * | 10/1995 | Mouchmouchian | .. | A61J 7/0023 141/18 |
| 5,535,889 A * | 7/1996 | Lin | ..................... | A45C 11/20 206/546 |
| 5,921,394 A * | 7/1999 | Shroff | ................ | B65D 83/0454 206/534 |
| 6,119,889 A | 9/2000 | Fujii et al. | | |
| 6,126,010 A * | 10/2000 | Kogen | ..................... | A45F 3/20 206/218 |
| 6,158,607 A * | 12/2000 | Wallberg | ............ | B65D 43/0218 220/212 |
| 6,398,071 B1 * | 6/2002 | Fellers | ..................... | A47F 1/08 221/174 |
| D459,637 S | 7/2002 | Tardif et al. | | |
| D480,590 S * | 10/2003 | Linz | ..................... | D7/300.1 |
| 6,705,491 B1 * | 3/2004 | Lizerbram | ........... | B65D 47/265 206/221 |
| D489,627 S | 5/2004 | Klitsner et al. | | |
| 6,820,767 B2 * | 11/2004 | Nicholas | ............. | A47G 19/2205 222/132 |
| D499,342 S | 12/2004 | Klitsner et al. | | |
| 6,913,165 B2 | 7/2005 | Linz et al. | | |
| 7,159,720 B2 * | 1/2007 | Pearson | ................. | B65D 83/04 206/533 |
| 7,240,795 B2 * | 7/2007 | Lee | ..................... | B65D 25/04 206/457 |
| 7,401,827 B1 * | 7/2008 | McGuerty | ............ | B65D 23/104 215/396 |
| 7,571,830 B2 * | 8/2009 | Lin | ..................... | A47J 41/0016 206/217 |
| D604,984 S | 12/2009 | Kalamaras | | |
| D614,447 S | 4/2010 | Richau et al. | | |
| D623,460 S * | 9/2010 | Krasner | ..................... | D7/300.1 |
| 7,954,515 B2 * | 6/2011 | Gerst | ................... | F16L 55/1141 138/89 |
| 7,959,346 B2 * | 6/2011 | Loden | ..................... | A47J 43/27 366/130 |
| D641,631 S | 7/2011 | Kawahara et al. | | |
| D646,919 S * | 10/2011 | Nilsson | ................. | B65D 47/148 D7/300.1 |
| 8,146,758 B1 * | 4/2012 | Peres | ................. | B65D 81/3205 215/6 |
| D674,497 S | 1/2013 | Smith | | |
| 8,342,349 B2 * | 1/2013 | Lu | ..................... | A47G 19/00 220/23.86 |
| 8,475,856 B2 * | 7/2013 | Sheehan | ............. | B65D 51/2857 426/115 |
| 8,499,951 B1 * | 8/2013 | McDonald | ........... | B65D 23/106 215/396 |
| 8,752,720 B1 * | 6/2014 | Habig | ................ | A47G 19/2266 215/306 |
| 8,777,044 B1 * | 7/2014 | Raymus | ............ | A47G 19/2272 220/526 |
| 8,783,487 B2 * | 7/2014 | Hojo | ..................... | B65D 1/0292 215/386 |
| 8,925,768 B1 * | 1/2015 | Ismail | ..................... | G01F 11/261 222/434 |
| D724,894 S | 3/2015 | Brosius | | |
| 9,016,488 B1 * | 4/2015 | Peres | ..................... | A61J 9/008 215/6 |
| D739,180 S | 9/2015 | Beardsell | | |
| 9,215,942 B2 * | 12/2015 | Bodum | ............ | A47G 19/2272 |
| D747,148 S | 1/2016 | Beardsell | | |
| D748,433 S | 2/2016 | Kushner | | |
| D752,390 S | 3/2016 | Ksiazek et al. | | |
| 9,427,112 B2 | 8/2016 | Aliberti et al. | | |
| 9,469,451 B2 * | 10/2016 | Dunn | ..................... | A47G 11/00 |
| D771,990 S | 11/2016 | Horowitz | | |
| D805,827 S | 12/2017 | Tóth | | |
| D813,593 S * | 3/2018 | Comu | ..................... | D7/392 |
| D836,985 S | 1/2019 | Otto | | |
| D841,381 S | 2/2019 | Karsten | | |
| 10,390,659 B2 | 8/2019 | Tolman et al. | | |
| 10,791,858 B2 * | 10/2020 | Robertson | ........... | A47J 31/0626 |
| 2001/0025865 A1 * | 10/2001 | Bravo | ..................... | B65D 23/104 222/465.1 |
| 2002/0008106 A1 * | 1/2002 | Bezek | ................. | B65D 23/0878 220/4.27 |
| 2004/0040962 A1 * | 3/2004 | Bielecki | ............ | A47G 19/2288 220/254.1 |

(56) References Cited

U.S. PATENT DOCUMENTS

| | | | |
|---|---|---|---|
| 2004/0066705 A1* | 4/2004 | Linz | A47J 43/27 366/130 |
| 2004/0262306 A1* | 12/2004 | Smith | B65D 21/0228 220/4.26 |
| 2006/0226035 A1* | 10/2006 | Smith | B65D 25/08 206/219 |
| 2007/0138176 A1* | 6/2007 | Gawlick | B65D 21/083 220/4.26 |
| 2007/0221602 A1* | 9/2007 | Dib | B65D 21/0228 215/6 |
| 2008/0217285 A1* | 9/2008 | Roth | B65D 77/283 215/229 |
| 2009/0178940 A1* | 7/2009 | Said | B65D 81/3205 206/221 |
| 2009/0188884 A1* | 7/2009 | Nelson | B65D 81/3205 215/6 |
| 2009/0236341 A1* | 9/2009 | McKinney | A47G 19/2266 220/375 |
| 2010/0200438 A1* | 8/2010 | Davies | B65D 71/502 206/223 |
| 2011/0036803 A1* | 2/2011 | Mejia | B65D 51/28 215/228 |
| 2011/0101021 A1* | 5/2011 | Greer | B65D 81/3211 222/1 |
| 2011/0108506 A1 | 5/2011 | Lindhorst-Ko | |
| 2011/0204090 A1* | 8/2011 | Worthington | B05B 12/081 222/144.5 |
| 2011/0278216 A1* | 11/2011 | Hull | A47G 19/2272 210/236 |
| 2012/0193316 A1* | 8/2012 | Starks | B65D 81/3205 215/6 |
| 2012/0248004 A1* | 10/2012 | Naghavi | B65D 81/3205 206/538 |
| 2013/0032566 A1* | 2/2013 | Lee | A45F 3/16 215/316 |
| 2014/0091086 A1* | 4/2014 | Sorensen | A47G 19/2205 220/4.27 |
| 2014/0103037 A1* | 4/2014 | Strominger | B65D 43/0231 220/23.83 |
| 2014/0183226 A1* | 7/2014 | Fily | B65D 25/20 222/143 |
| 2014/0233344 A1* | 8/2014 | Aliberti | B01F 15/00512 366/130 |
| 2014/0238949 A1* | 8/2014 | Patel | A47G 19/2272 215/6 |
| 2014/0360908 A1* | 12/2014 | Sorensen | B65D 51/28 206/501 |
| 2014/0374413 A1* | 12/2014 | Lyon | A45F 3/20 220/4.13 |
| 2015/0144516 A1* | 5/2015 | Shamoon | A47G 19/2205 206/459.1 |
| 2015/0197390 A1* | 7/2015 | Kurabe | B65D 81/3841 220/592.27 |
| 2015/0201773 A1* | 7/2015 | Sorensen | A47J 43/27 220/254.5 |
| 2015/0250349 A1* | 9/2015 | Ng | A47J 31/404 215/227 |
| 2016/0088960 A1* | 3/2016 | Liang | B65D 81/3869 220/560.01 |
| 2016/0150914 A1* | 6/2016 | Waggoner | B01F 3/0865 366/130 |
| 2016/0244217 A1* | 8/2016 | Maple | B65D 47/2018 |
| 2016/0280447 A1 | 9/2016 | Beardsell | |
| 2017/0065942 A1* | 3/2017 | Dayton | A47J 43/27 |
| 2017/0079479 A1* | 3/2017 | Ross | B01F 13/0022 |
| 2017/0105581 A1* | 4/2017 | Enghard | B01F 13/0055 |
| 2017/0129665 A1* | 5/2017 | Rolfes | B65D 1/0246 |
| 2018/0368623 A1* | 12/2018 | Cerasani | A47J 31/44 |
| 2019/0047773 A1 | 2/2019 | Bullock et al. | |
| 2020/0216232 A1* | 7/2020 | Noveletsky | B65D 25/2852 |

* cited by examiner

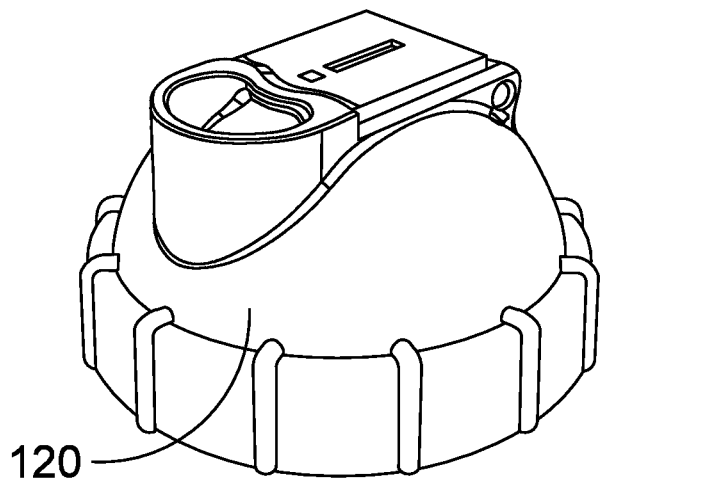
FIG. 11
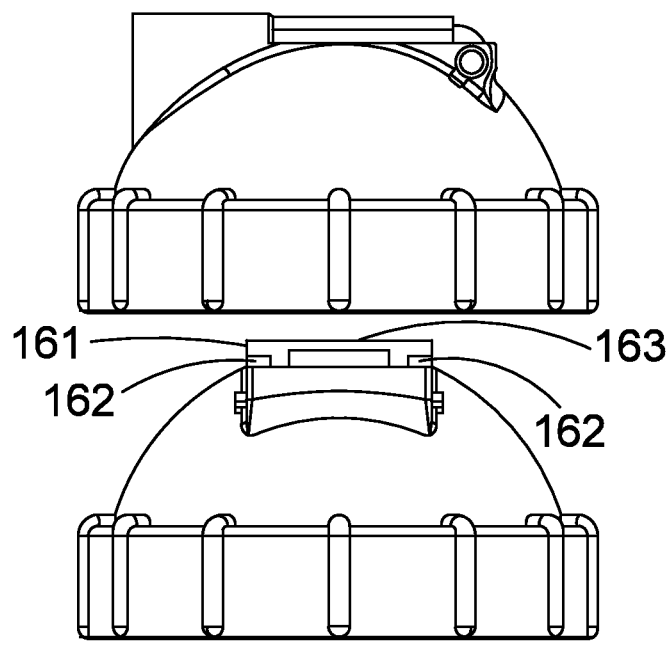
FIG. 12
FIG. 13
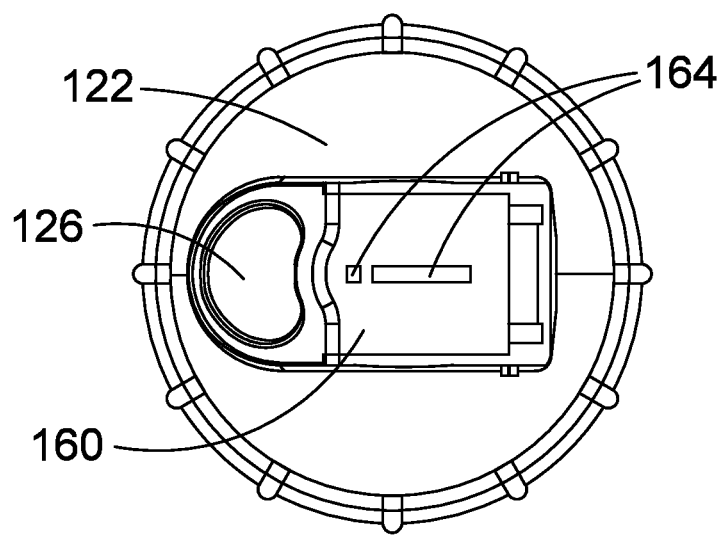
FIG. 14

TUMBLER BOTTLE

CROSS-REFERENCE TO EARLIER APPLICATIONS

The present application is a continuation-in-part of U.S. patent application Ser. No. 15/047,682 filed Feb. 16, 2016. Application Ser. No. 15/047,682 claims priority of Australian patent application number AU2015100381 filed on Mar. 25, 2015. The entire content of these applications is incorporated herein by reference.

BACKGROUND OF THE INVENTION

The present technology relates generally to sports bottles of the kind which accompany an athlete to a workout session at a gymnasium, track or field.

The bottle also has particular application to the kitchen for mixing dressings and mixtures having suspended solids.

Known sports and/or mixing bottles generally include a main chamber closed by a lid having a centrally disposed outlet for dispensing a drink. The outlet may include a valve or closure for controlling dispensing of the drink.

A common complaint from users of sports bottles in which powdered supplements are to be mixed is the tendency for dry, powdered mixes to incompletely mix with liquids, resulting in an accumulation of unmixed solids as waste in the bottom of the bottles. To overcome this deficiency, others have introduced accessories such as mixing or stirring balls, agitators, whisks, strainers, filters, mesh screens, protrusions, rotating blades or vanes into the bottle to facilitate the breakdown of solids and otherwise inhibit the accumulation of liquid swelled material in corners of the interior of the sports bottle.

SUMMARY OF THE INVENTION

In certain examples, a tumbler bottle can be configured for retaining a volume of liquid as well as for mixing liquids with solids, semi-solids, and semi-liquids. In accordance with various aspects there is provided a tumbler bottle including a cup having a side wall and a bottom wall to define a first mixing chamber. The interior surfaces of the side and bottom walls are smooth, and the bottom wall interior surface is convex. The side and bottom wall interior surfaces are connected by a smooth transition surface. The tumbler bottle further includes a lid removably connected with the cup. The lid has side and top walls each having smooth interior surfaces connected by a smooth transition surface to define a second mixing chamber. The top wall interior surface is concave. A dispensing outlet is arranged on a portion of the lid. The dispensing outlet may be on a portion of the lid side wall, a portion of the lid top wall or positioned on a portion of the lid side wall and the lid top wall. According to one or more aspects, the lid also includes a dispensing outlet and a closure.

BRIEF DESCRIPTION OF THE DRAWINGS

Other aspects and advantages of the disclosure will become apparent from a study of the following description when viewed in the light of the accompanying drawings in which:

FIG. 11 is a right front perspective view of an alternate embodiment of a tumbler bottle lid;

FIG. 12 is a right side view of the lid of FIG. 11;

FIG. 13 is a rear view of the lid of FIG. 11;

FIG. 14 is a top view of the lid of FIG. 11;

DETAILED DESCRIPTION

In the following description reference is made to the accompanying drawings illustrating various examples in which aspects of the disclosure may be practiced. It is to be understood that other examples may be utilized, and structural and functional modifications may be made without departing from the scope and spirit of the present disclosure.

Aspects of this disclosure relate to a bottle or tumbler configured for storing a volume of liquid and for storing and mixing a volume of liquid with one or more additives. The tumbler is easy to clean, thus improving the user experience. The interior of the container (including two hemispherical mixing chambers) efficiently and uniformly mixes contents without requiring additional components or devices, making it more efficient and less expensive to produce.

Figure 1:
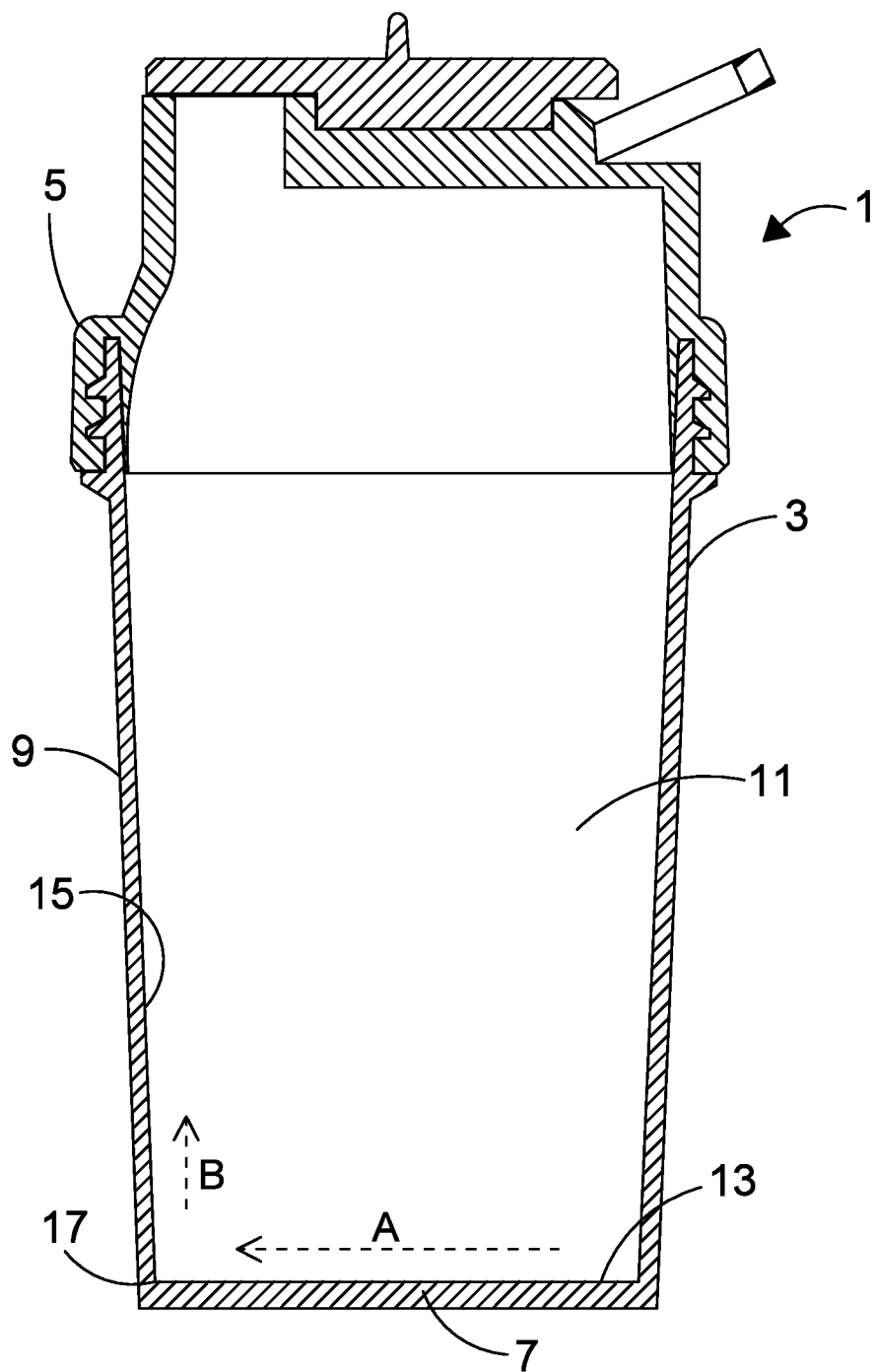
FIG. 1 depicts a cross-sectional view of a known shaker bottle.

FIG. 1 illustrates a cross-sectional view of a conventional sports bottle 1 including a cup 3 and a lid 5. The cup 3 includes a bottom wall 7 and a side wall 9. The bottom wall 7 and the side wall 9 define an interior space or chamber 11. The interior surface 13 of the bottom wall and the interior surface 15 of the side wall are joined by an angular transition, defining a corner 17.

When water is added to protein powder, the outer layer of the protein powder is wetted, absorbs water and is swollen, forming a thick clump of material while the powder core remains dry. Because the clumped material has a higher viscosity than water, the water swelled bubble protects and prevents the core of the protein powder clump from contacting water outside the bubble, making it difficult to dissolve the powder core.

When liquid flows in the interior space 11 of the cup 3, the change in direction of liquid flow occurs rapidly in the corner 17, as indicated by arrows A, B in FIG. 1. That is, the side wall 15 impedes the inertial movement of the liquid in the direction A, so that the flow rate is reduced and the flow is not continuous. Consequently, water swelled material may become stuck in the corner 17 and tends to remain compacted and unmixed.

Furthermore, the accumulation of material in a corner 17 is difficult to clean, resulting in the formation of residues which contribute to the growth of bacteria.

Figure 2A:
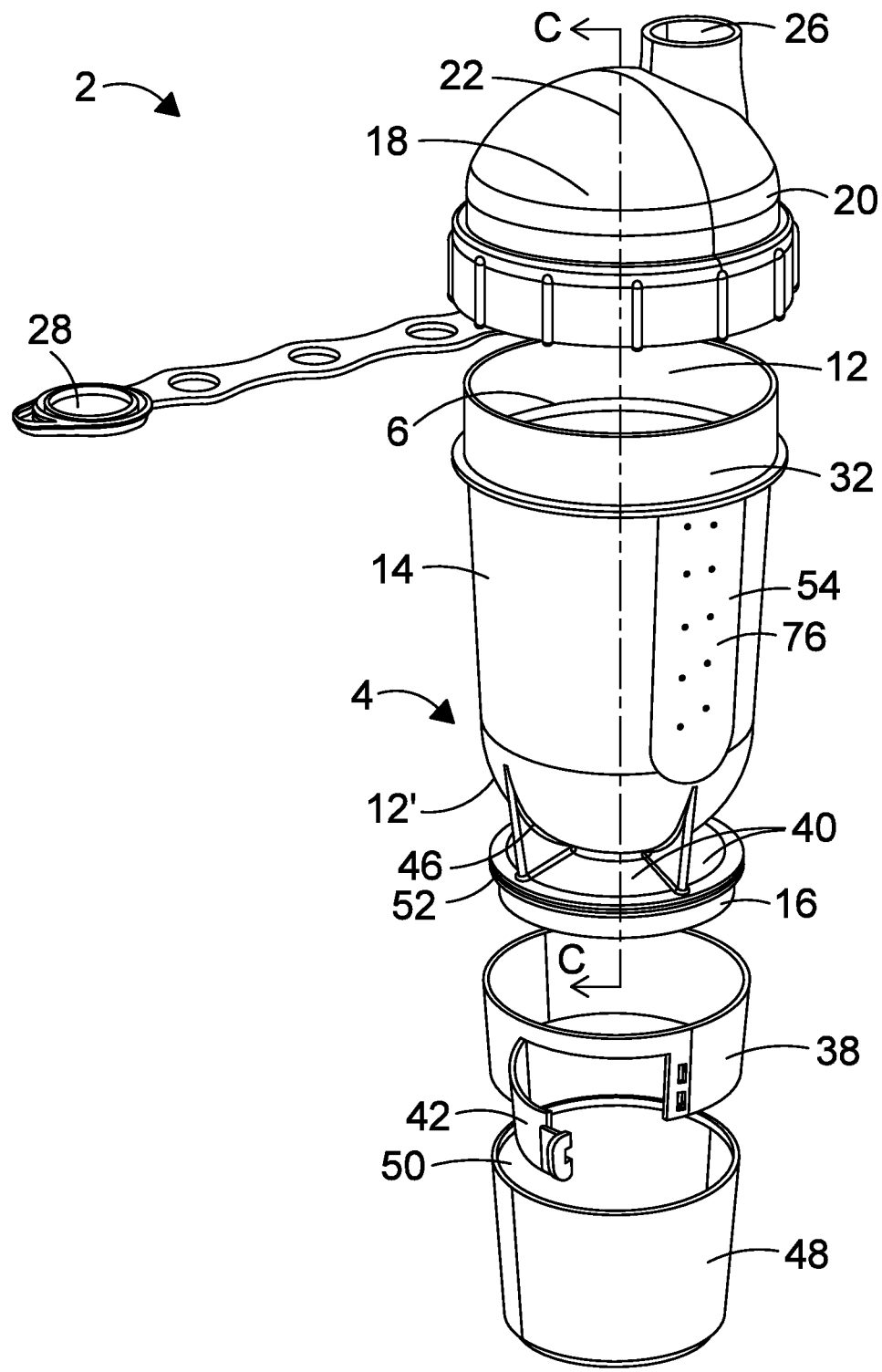
FIGS. 2A and 2B are exploded perspective views, respectively, of a tumbler bottle in accordance with the disclosure.
Figure 2B:
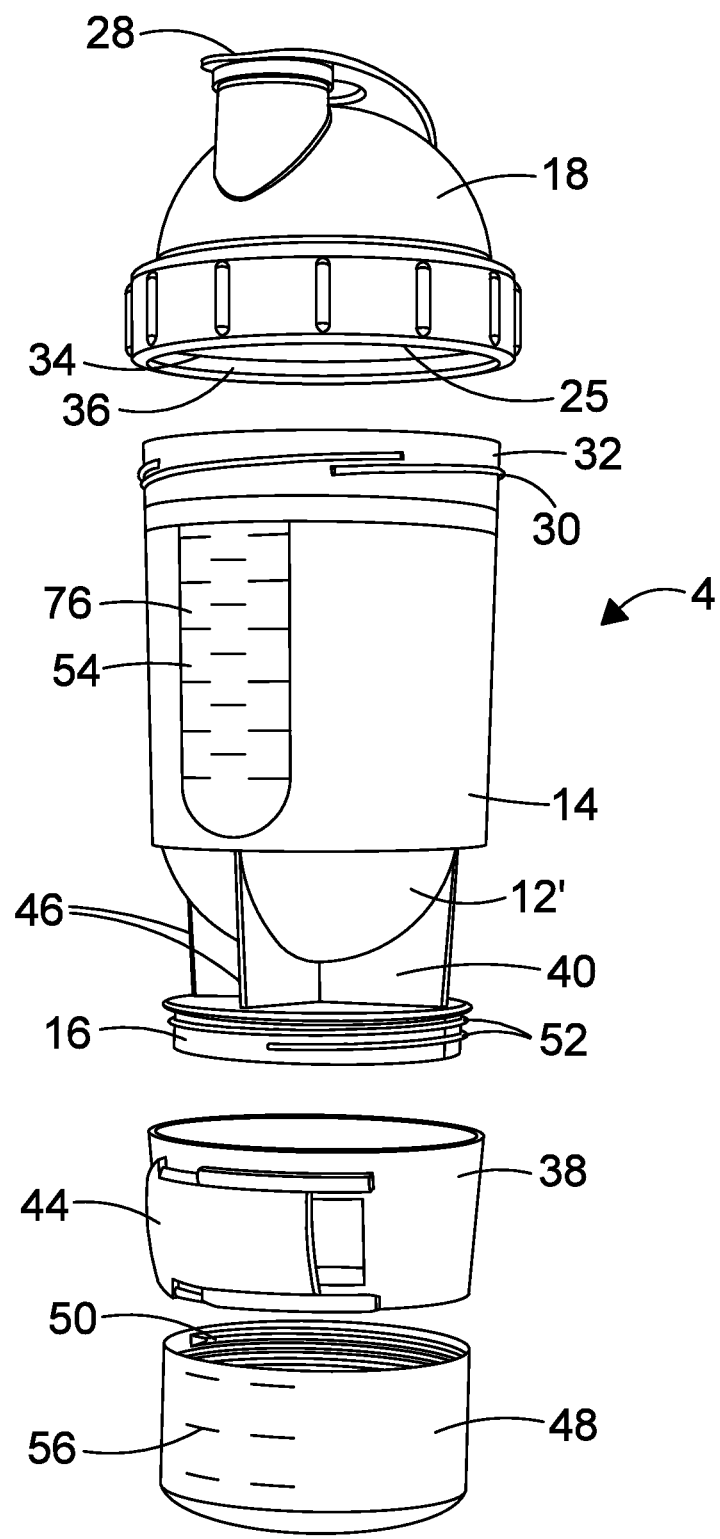
Figure 2C:
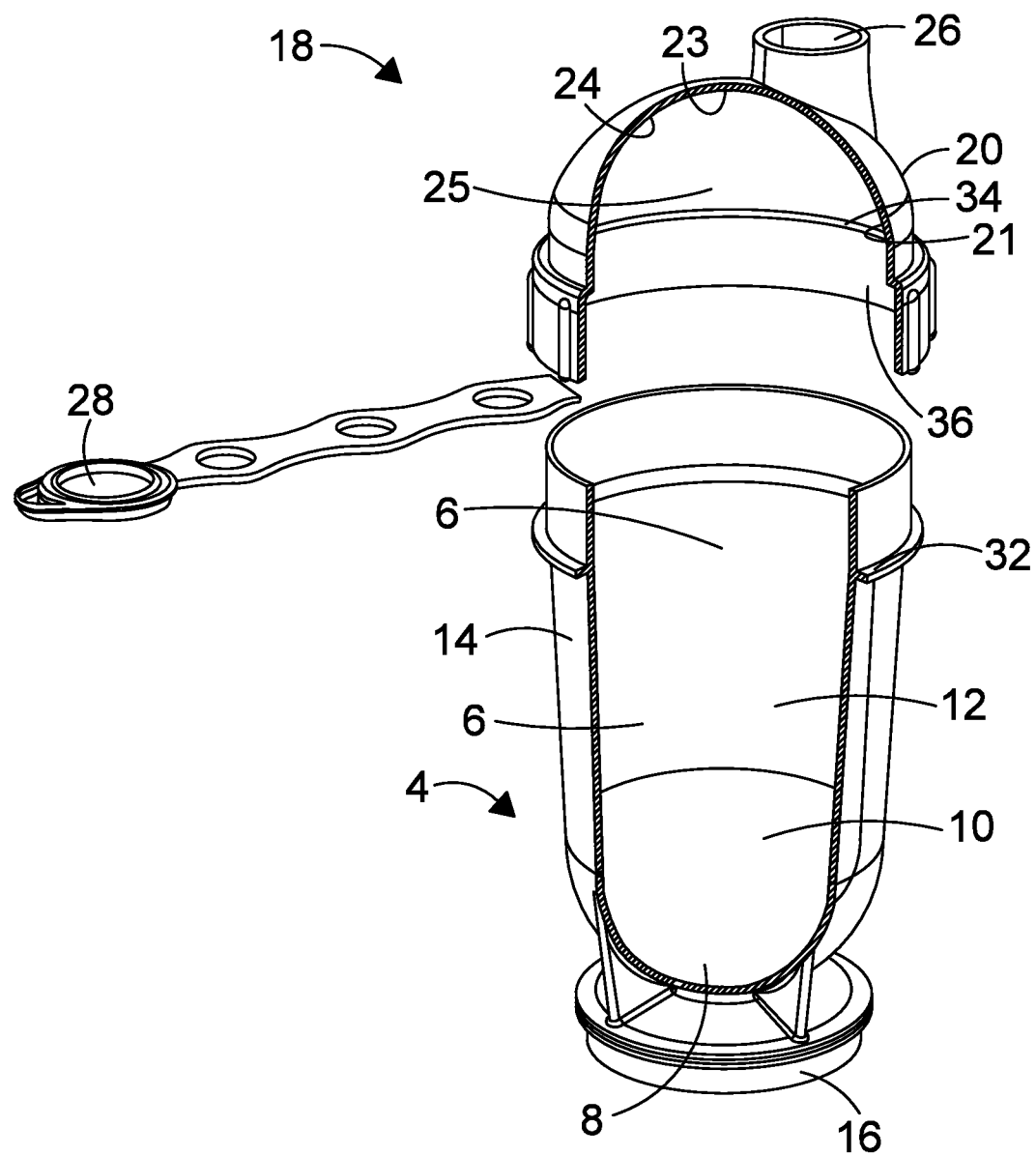
FIG. 2C is a cross-sectional view of the bottle of FIG. 2A taken along line C of FIG. 2A.
Figure 3:
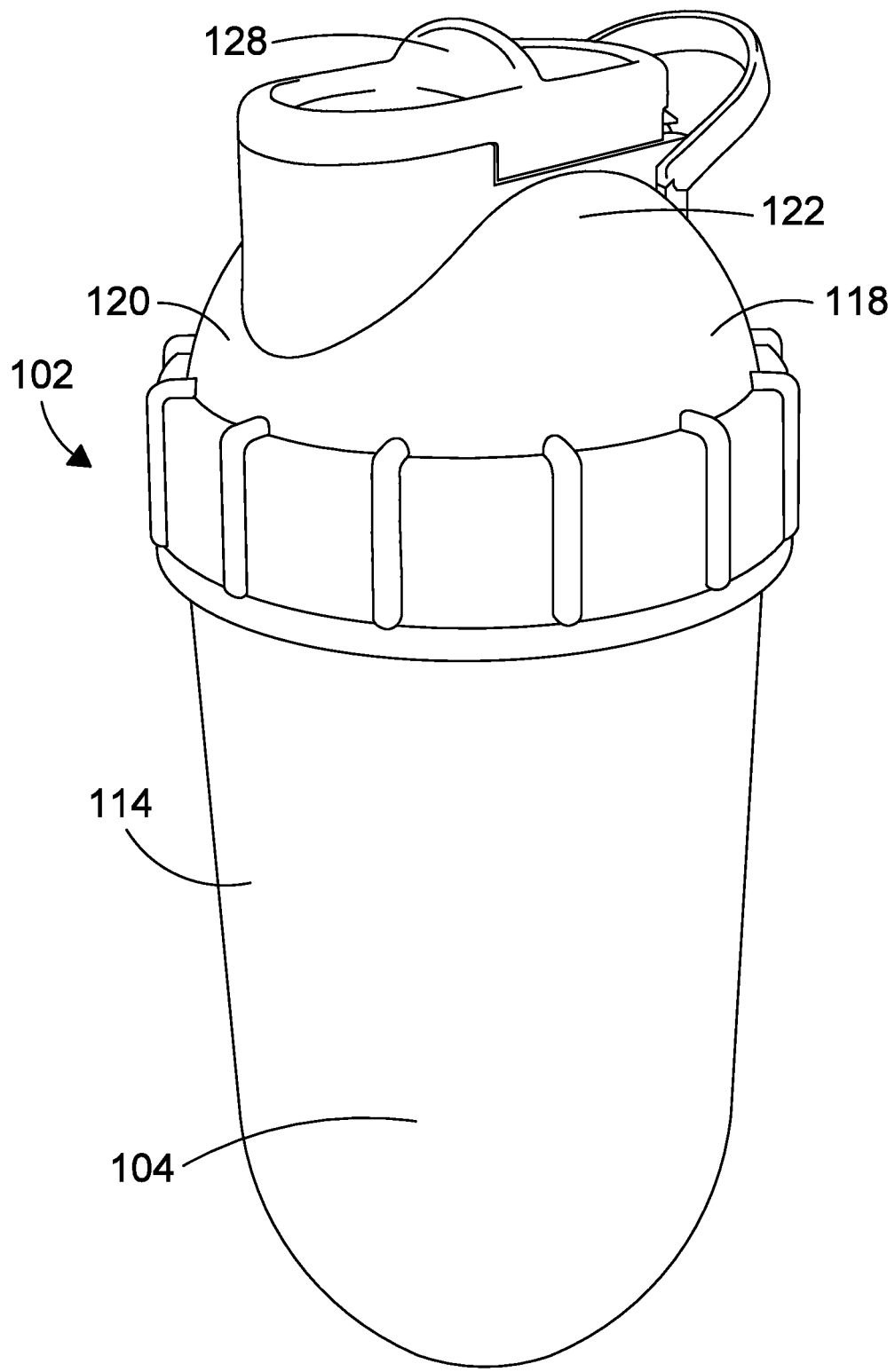
FIG. 3 is a front perspective view of an alternate embodiment of the tumbler bottle.
Figure 4:
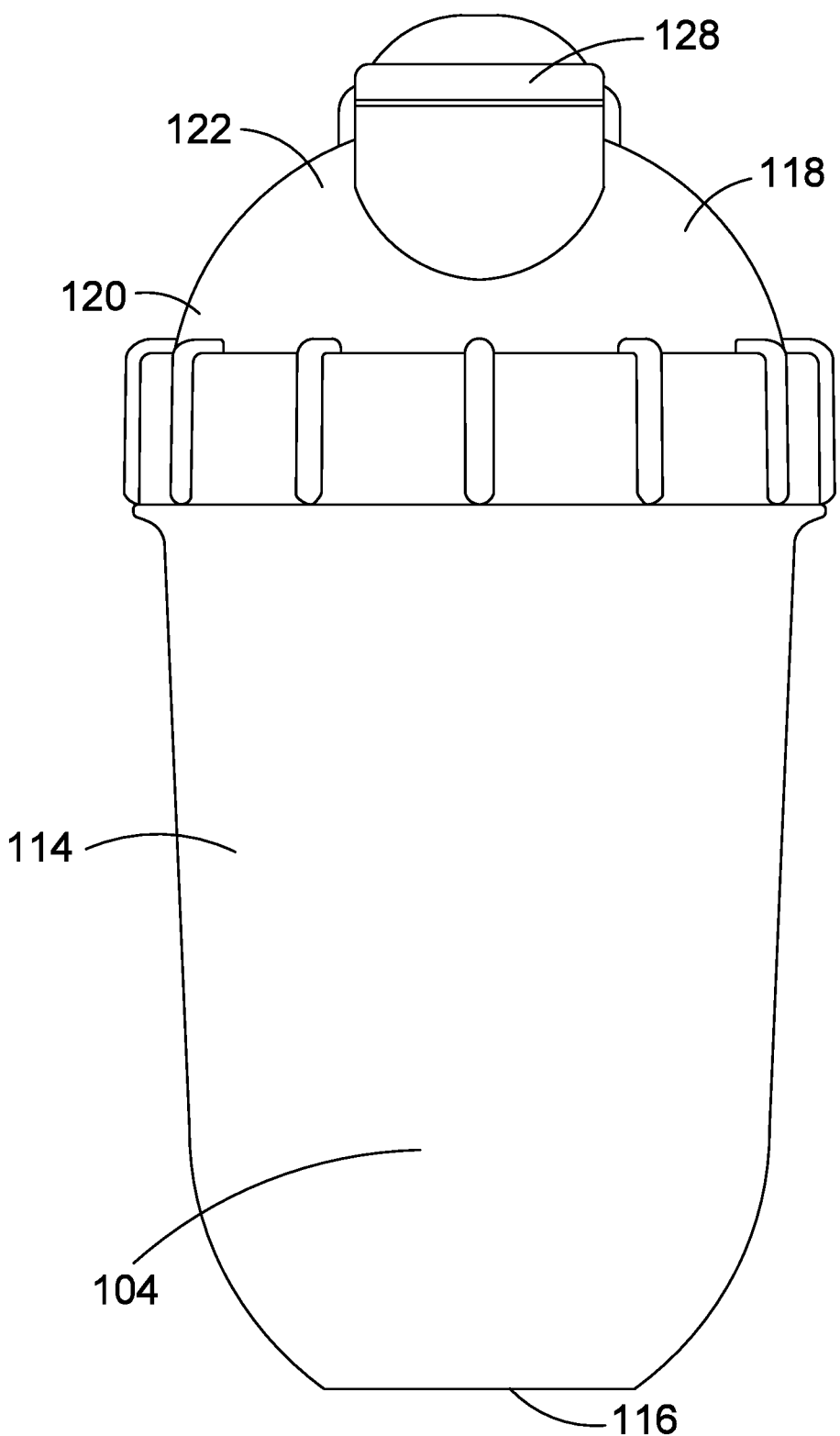
FIG. 4 is a front view of the tumbler bottle of FIG. 3.
Figure 5:
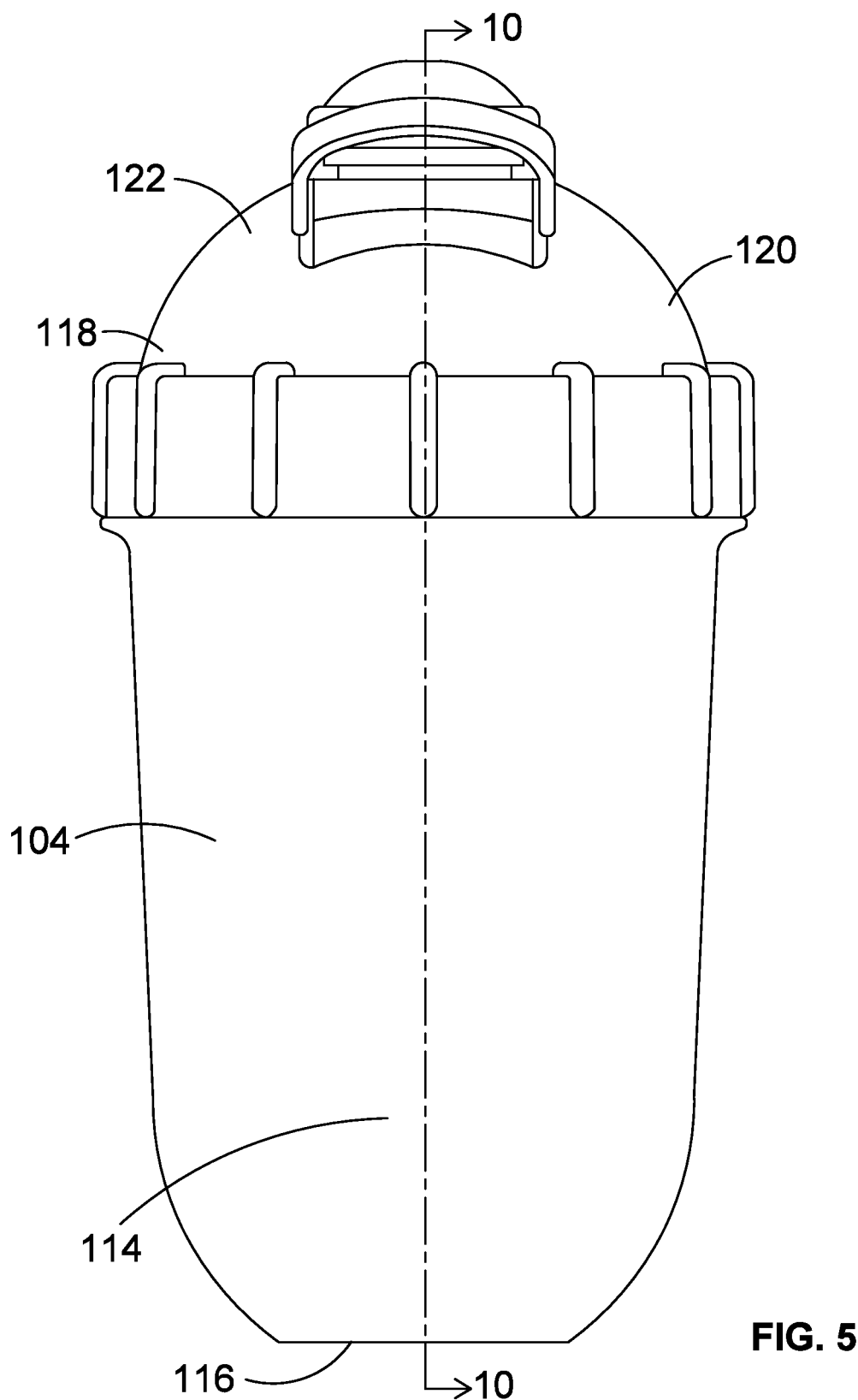
FIG. 5 is a rear view of the tumbler bottle of FIG. 3.
Figure 6:
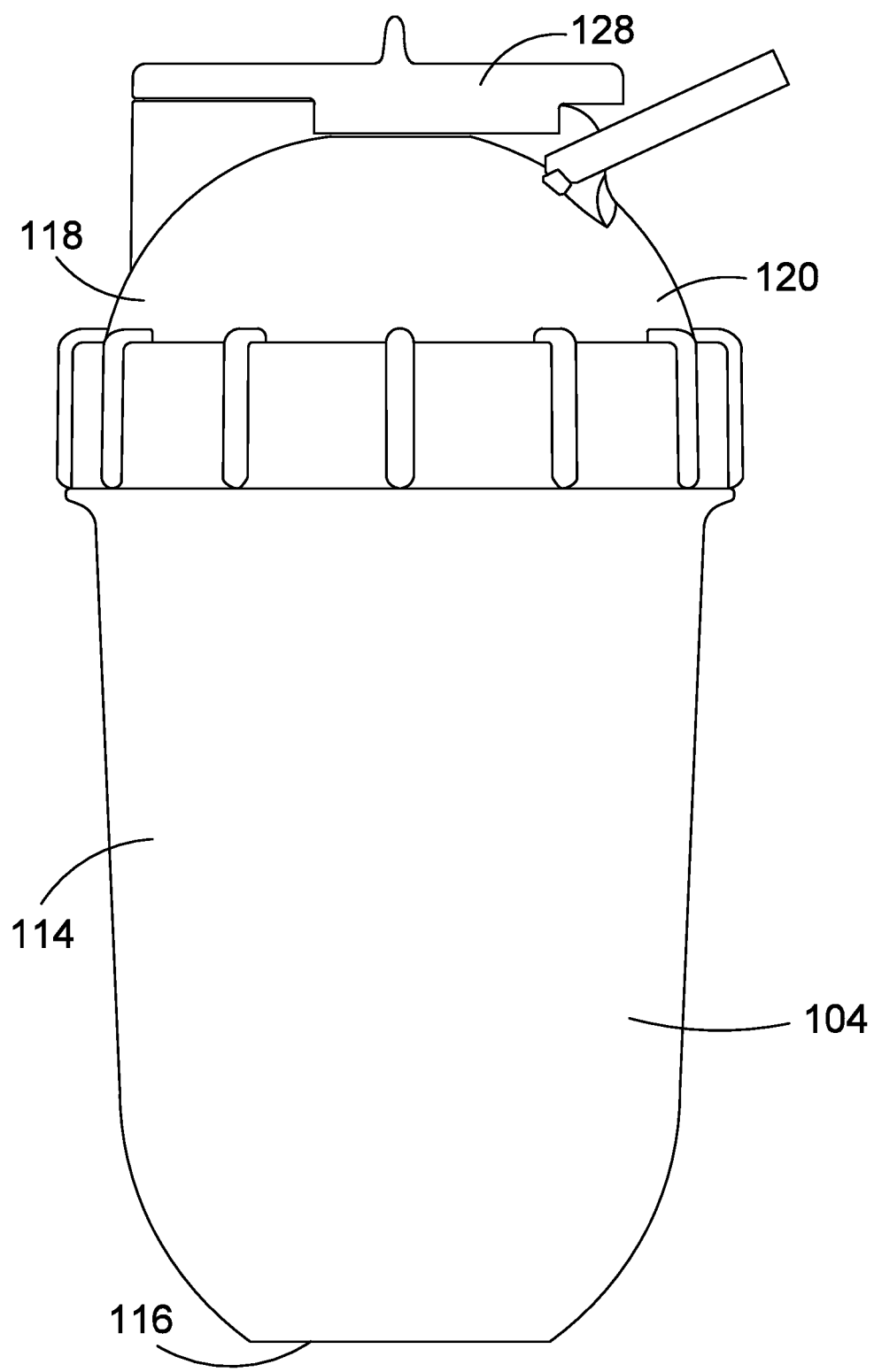
FIG. 6 is a right side view of the tumbler bottle of FIG. 3.
Figure 7:
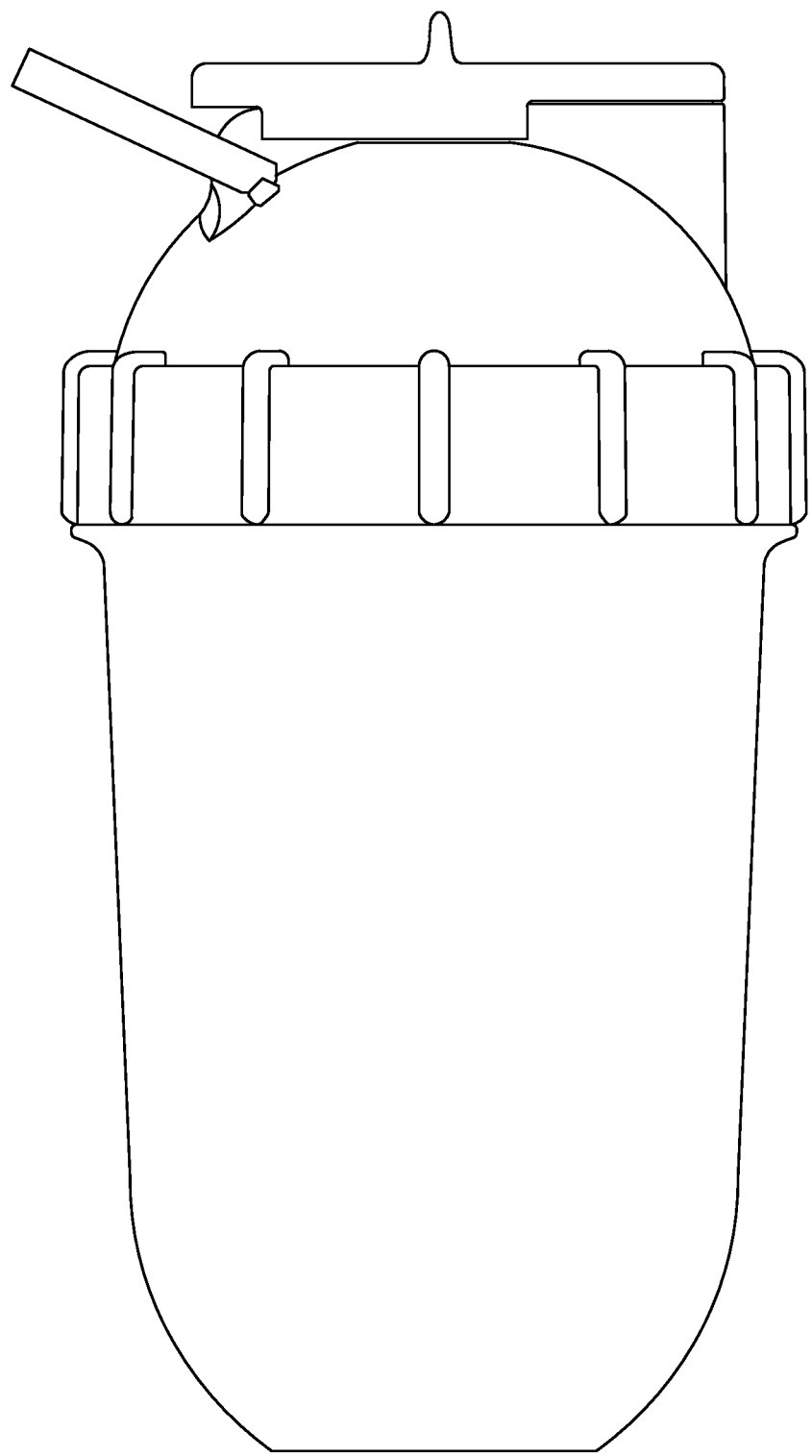
FIG. 7 is a left plan view of the tumbler bottle of FIG. 3.
Figure 8:
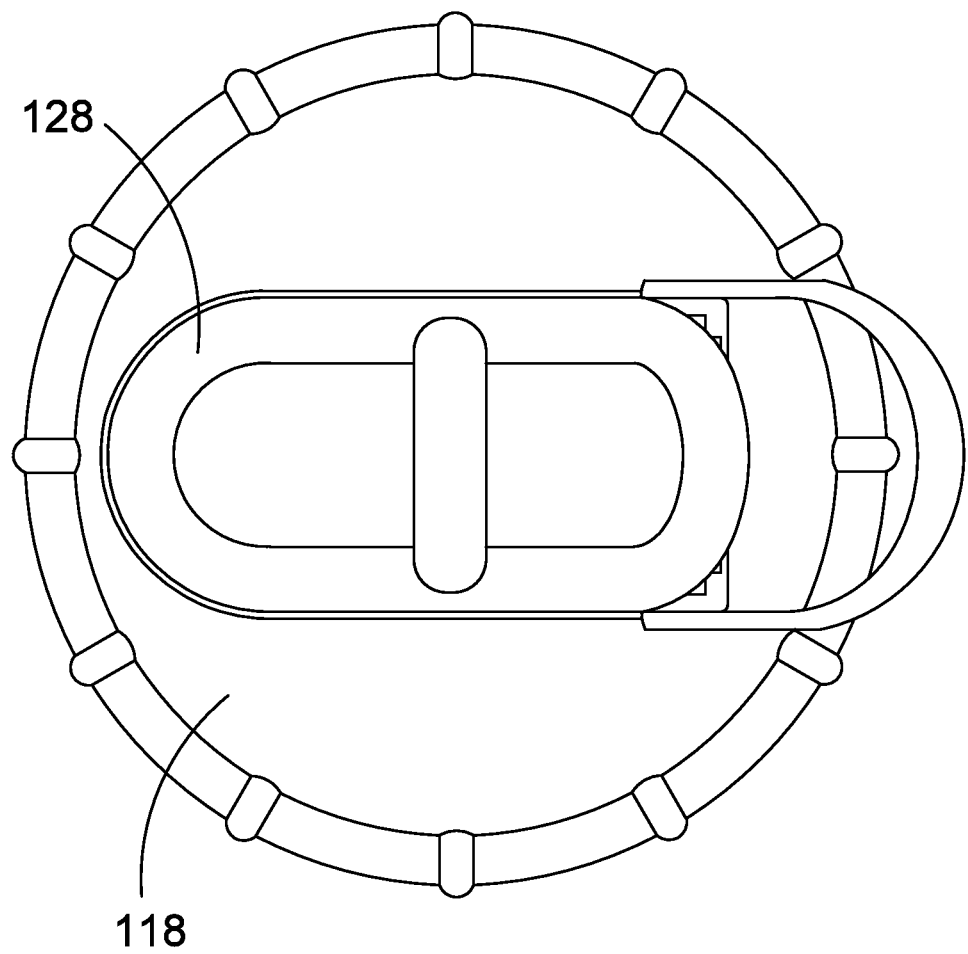
FIG. 8 is a top view of the tumbler bottle of FIG. 3.
Figure 9:
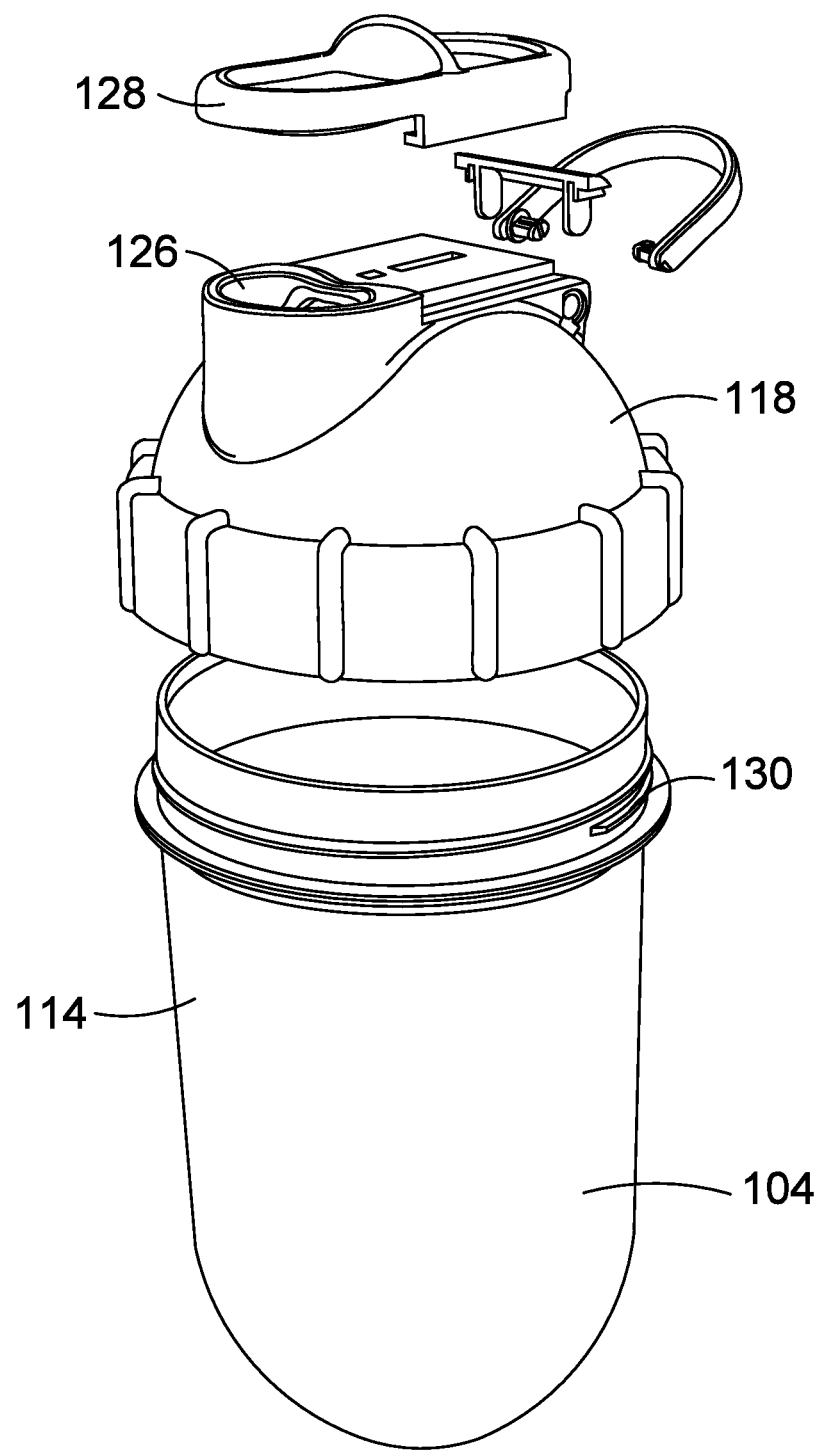
FIG. 9 is an exploded perspective view of the tumbler bottle of FIG. 3.

In FIGS. 2A-2C there is provided a tumbler bottle 2 including a cup 4 having side wall interior surface 6 and bottom wall interior surface 8 defining a first mixing chamber 12. The interior surfaces of the side wall 6 and bottom wall 8 are smooth and the bottom wall interior surface 8 is convex. The side wall interior surface 6 and bottom wall interior surface 8 are connected by a smooth transition surface 10. The cup 4 further includes a side wall exterior surface 14 and a substantially flat exterior bottom wall 16.

A lid 18 is removably connected with the cup 4 and has a side wall 20 and a concave interior top wall surface 23. The lid side wall exterior surface 20 and top wall exterior surface 22 are concave. The interior top wall surface 23 and interior side wall surface 21 are connected by a smooth interior transition surface 24 defining a lid or second mixing chamber 25. The lid mixing chamber 25 is in fluid communication with the cup chamber 12 when the lid 18 is removably connected with the cup 4.

A dispensing outlet 26 is arranged on a portion of the lid 18. The dispensing outlet 26 may be on a portion of the lid side wall, a portion of the lid top wall or positioned on a portion of the lid side wall and the lid top wall. According to one or more aspects, the lid 18 also includes a closure 28 arranged on an exterior surface of the lid 18. In accordance with the embodiment of FIGS. 2A-2C the closure 28 may be a snap or friction fit. In other aspects (discussed in greater detail below) the closure may have a sliding arrangement that is configured to lock in a plurality of positions. According to one or more aspects, the tumbler bottle 2 first and second mixing chambers 12, 25 may each be semi-capsule, semi-ellipsoidal or hemispherical in shape.

The lid 18 may be removably connected to cup 4 by a thread 30 on a lip 32 of the cup 4 for cooperating with a thread 34 mounted on a lip 36 of lid 18.

In the configuration of FIGS. 2A and 2B, the bottle 2 also includes a hold 38 suitable for storing solid nutrition supplements and other items, the hold 38 comprising a plurality of supplement chambers 40 being separated from cup 4 and arranged on an outside surface of cup 4.

In the configuration of FIG. 2A, the hold 38 is closed by a hinged door 42. In the configuration of FIG. 2B, hold 38 is closed by a sliding door 44.

The supplement chambers 40 are separated from one another by dividers 46. In one aspect the dividers 46 may be supporting gussets which support cup 4. The supplement chambers 40 are radially adjacent to the exterior surface of the cup mixing chamber 12.

The tumbler bottle 2 includes a sump 48 for holding further supplements. The sump 48 may be disposed in any suitable position such as under the lid 18, so that the dispensing outlet would extend through the sump 48, but in one embodiment the sump 48 forms a part of the hold 38 and is disposed under the supplement chambers 40.

In one embodiment threads 50 of the sump 48 are connected to threads 52 arranged on cup 4 bottom wall 16 to retain hold 38 on cup 4.

In one embodiment the cup 4 has a cylindrical exterior configuration, but could be square in section, rectangular while still having radiused internal smooth transition surfaces.

In accordance with various aspects, an exterior surface 14 of cup 4 may include measurement indicia 54. In accordance with various aspects the sump 48 may include measurement indicia 56.

The tumbler bottle of FIGS. 3-9 illustrates a tumbler bottle 102 having a lid and cup with opposing hemispheres creating a mixing environment that does not require mixing accessories. The tumbler bottle includes a cup 104 and a lid 118. When cup 104 and lid 118 are removably coupled together the connection is leakproof. According to an aspect illustrated in FIG. 10, the cup 104 and lid 118 are coupled together by a threaded connection 130, 136. In alternative aspects, not illustrated, the cup and lid may be coupled together by a snap fit connection, a friction fit connection or by other suitable connection methods.

Cup 104 includes a side wall interior surface 106 and bottom wall interior surface 108. The side wall interior surface 106 and bottom wall interior surface 108 define a first mixing chamber 112. The interior surfaces of the side wall 106 and bottom wall 108 are smooth and the bottom wall interior surface 108 is convex. The interior surfaces of side wall 106 and bottom wall 108 are connected by a smooth transition surface 110. The cup 104 further includes a side wall exterior surface 114 and a substantially flat bottom wall exterior surface 116.

Smooth transition surface 110 is configured as an arc and does not include sharp corners or transition surfaces which can obstruct a continuous flow of liquid within the first mixing chamber 112.

Lid 118 is removably connected with cup 104 and includes a side wall exterior surface 120 and a concave top wall exterior surface 122. The lid has a smooth side wall interior surface 121 and a smooth top wall interior surface 123 connected by a smooth transition surface 124 to define a lid or second mixing chamber 125. The top wall interior surface 123 is concave.

Lid smooth transition surface 124 notability does not include sharp corners at the transition between the interior top wall 123 and the interior side wall 121, but rather is configured as an arc 124 which facilitates the continuous flow of liquid within the second mixing chamber 125.

When lid 118 and cup 104 are coupled together, the interior configuration may be one of capsule or ellipsoidal. More particularly, first mixing chamber 112 of the cup may be hemispherical, and the interior space 125 of the lid may be hemispherical and the intermediate portion may be approximately cylindrical. While the embodiments disclosed herein include a cup and lid having smooth interior arcuate transition surfaces 110, 124, those skilled in the art will appreciate that only one of the cup and lid need to be configured to include a smooth arcuate transition surface.

When lid 118 and cup 4 are coupled together, the transition space 158 between interior space of cup and the interior space of the lid is smooth, further contributing to the continuous movement of contents without obstruction during a shaking action.

In accordance with multiple aspects, during a shaking action, liquid moves within the tumbler bottle along the arc of the transition surfaces without encountering obstacles thus maintaining a tangential velocity. Within the cup mixing chamber 112 and the lid mixing chamber 125 there are no prominent features (e.g., edges, bosses, etc.) to hinder the movement of the contained liquid which further ensures continuous movement of the contents within the interior of the tumbler bottle 102. Such unobstructed movement of contents enables tumbler bottle 102 to macerate soft fruits, as well as uniformly mix liquids with powders and/or macerated fruits. Such mixtures being sufficiently uniform so that when the contents of the tumbler are emptied, nearly zero unmixed residue remains behind as waste.

As illustrated in FIGS. 11-14, at least a portion of one of the lid side wall 120 and top wall 122 include an opening 126 configured for dispensing contents from the tumbler bottle 102. A platform 160 is arranged on an exterior surface of the lid top wall 122 adjacent to the opening 126. An integral track 162 is arranged on a side wall 161 of platform 160. A top wall of platform 160 includes a plurality of notches 164.

A closure 128 (illustrated in FIGS. 15-18) is connected with the lid 118 for sliding movement along track 162 relative to the opening 126. A lower surface 166 of the closure 128 includes a cavity 168 having a channel 170 arranged therein, the channel 170 being configured for receiving the platform track 162. A resilient detent 172 is arranged in spaced relation within the cavity 168 and is configured to cooperate with the notches 164 to lock the closure 128 in a selected position along the platform 160.

In accordance with various aspects, alternative configurations of the tumbler bottle design are presented in which like parts have like numbers.

Figure 40:
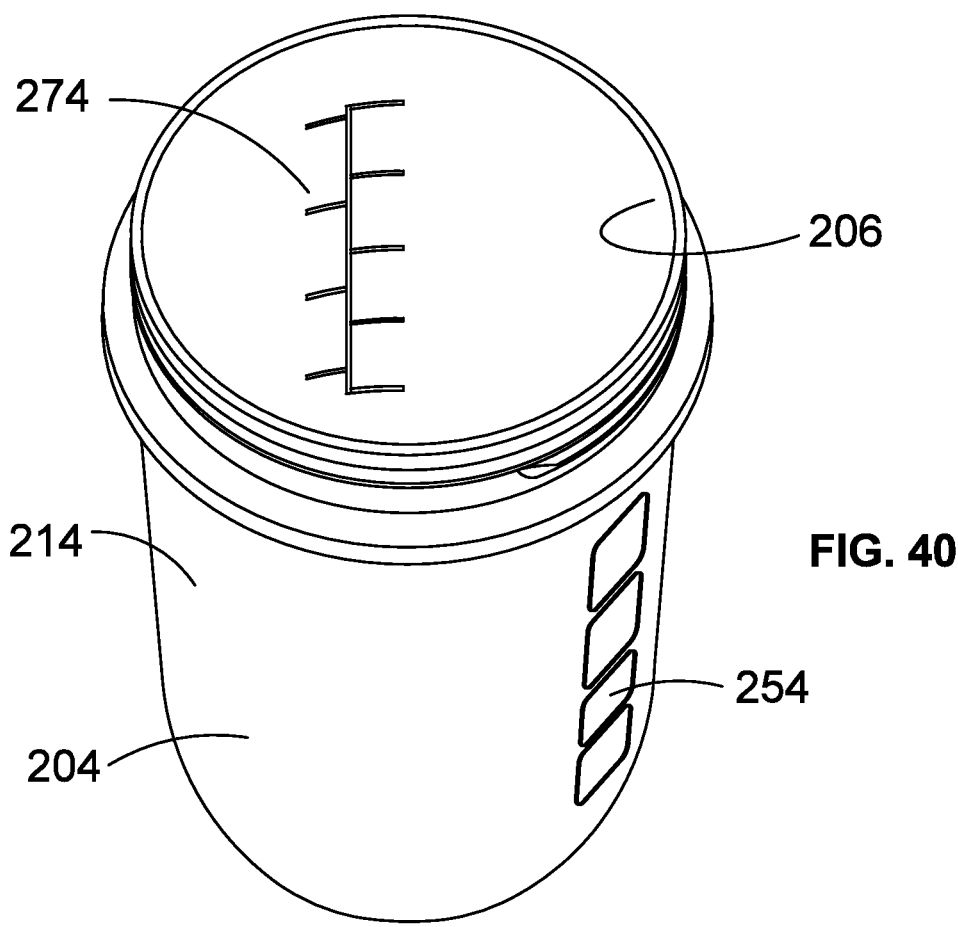
FIG. 40 is a top perspective view of the cup of FIG. 39.

In accordance with various aspects, a side wall 14, 114, 214 of the cup 4, 104, 204 may include measurement indicia. As illustrated in FIGS. 2A, 2B, 35, 36 and 40, measurement indicia 54, 154, 254 may be arranged on an exterior surface of cup 4, 104, 204. Alternatively, as illustrated in FIG. 40, measurement indicia 274 may be arranged on an inside surface 206 of cup 204. In a further alternative, as illustrated in FIGS. 2A, 2B, 35-36, a side wall 14, 114 of the cup 4, 104 may include a window 76, 176, the window being configured for viewing the contents contained within the cup 4, 104 as well as for receiving measurement indicia 54, 154.

Figure 10:
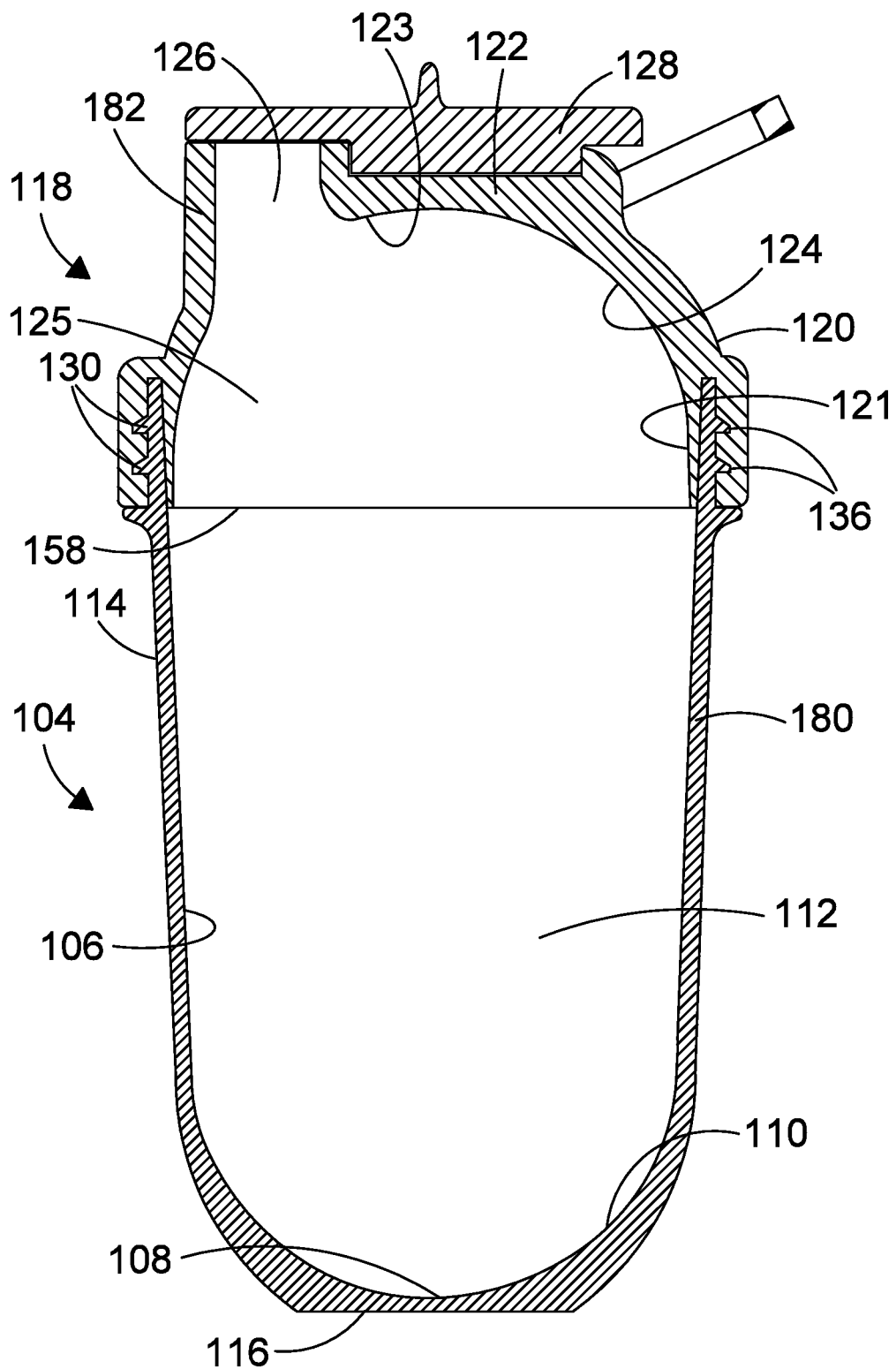
FIG. 10 is a cross-sectional view of the tumbler bottle of FIG. 3 taken along line 10-10 of FIG. 5.
Figure 15:
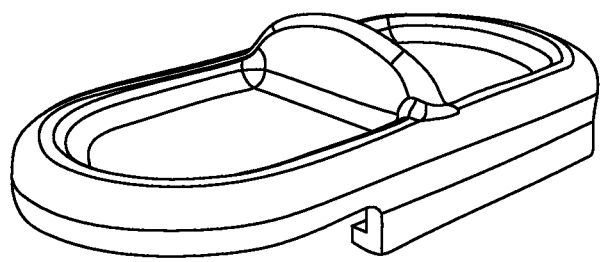
FIG. 15 is a right front perspective view a closure for the lid of FIG. 11.
Figure 16:
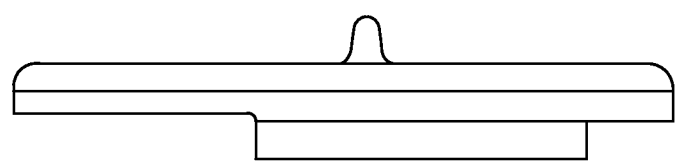
FIG. 16 is a right side view of the closure of FIG. 15.
Figure 17:
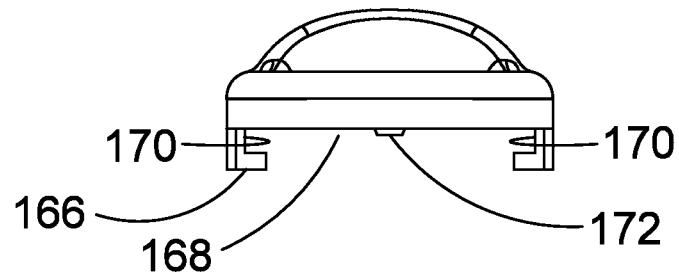
FIG. 17 is a rear view of the closure of FIG. 15.
Figure 18:
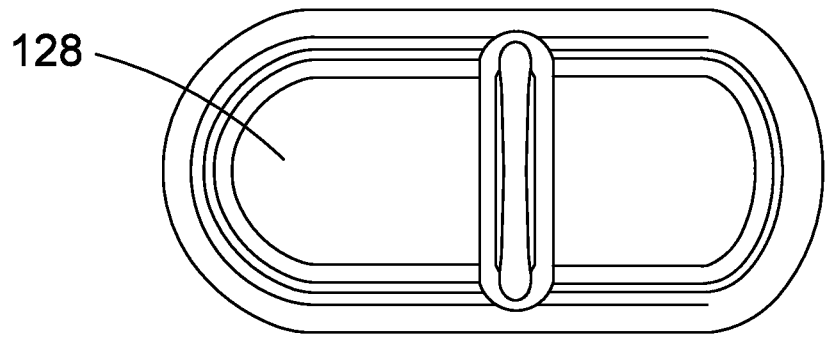
FIG. 18 is top view of the closure of FIG. 15.
Figure 19:
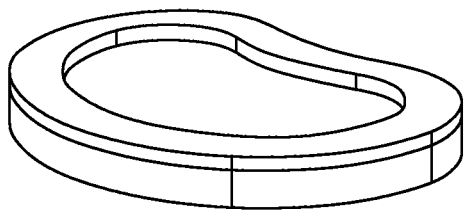
FIG. 19 is a front right perspective view of a gasket for the lid opening of FIG. 11.
Figure 23:
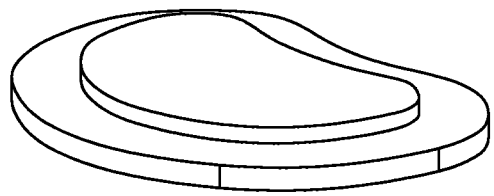
FIG. 23 is a front rear perspective view of a gasket for the closure of FIG. 15.
Figure 20:
FIG. 20 is a right side view of the gasket of FIG. 19.
Figure 24:
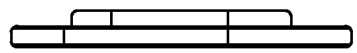
FIG. 24 is a right side view of the gasket of FIG. 23.
Figure 21:
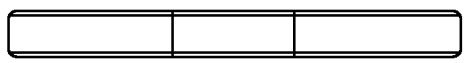
FIG. 21 is a rear view of the gasket of FIG. 19.
Figure 25:
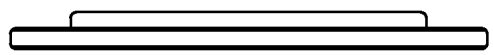
FIG. 25 is a rear view of the gasket of FIG. 23.
Figure 22:
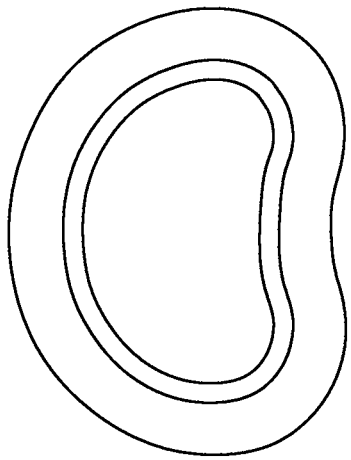
FIG. 22 is a top view of the gasket of FIG. 19.
Figure 26:
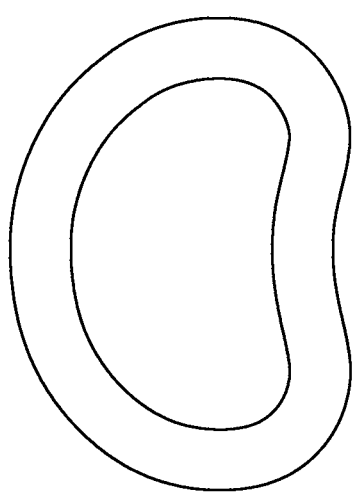
FIG. 26 is a top view of the gasket of FIG. 23.
Figure 27:
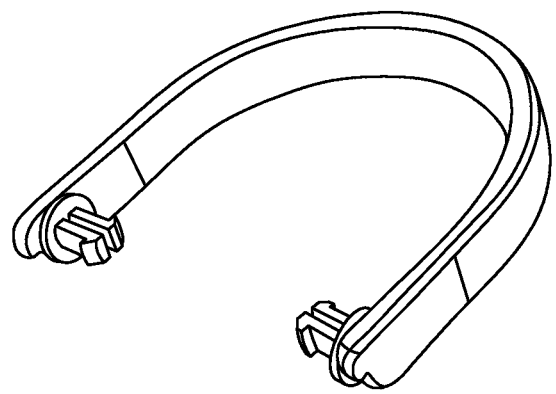
FIG. 27 is a top perspective view of a handle for the lid of FIG. 11.
Figure 28:
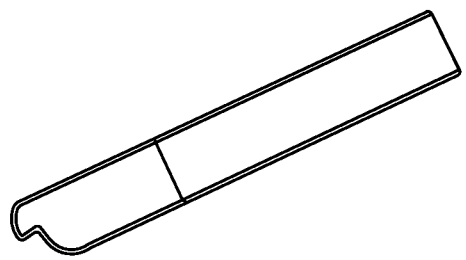
FIG. 28 is a right side view of the handle of FIG. 11.
Figure 29:
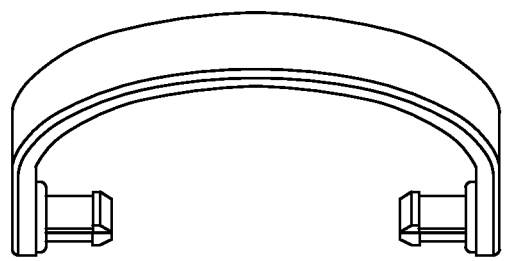
FIG. 29 is a rear view of the handle of FIG. 11.
Figure 30:
FIG. 30 is a top view of the handle of FIG. 11.
Figure 31:
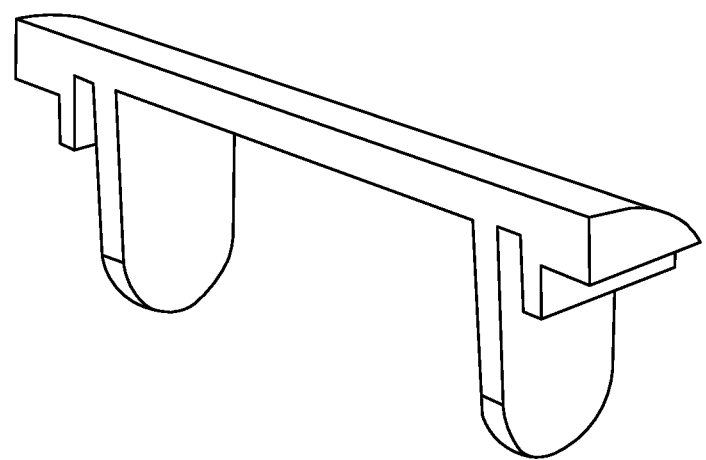
FIG. 31 is a front right perspective view of a handle cover for lid of FIG. 11.
Figure 32:
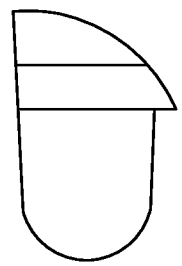
FIG. 32 is a right side view of the handle cover of FIG. 11.
Figure 33:
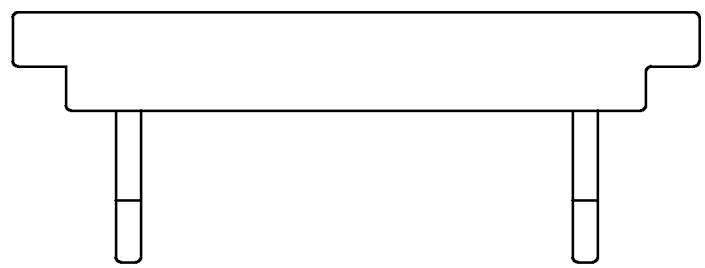
FIG. 33 is a rear view of the handle cover of FIG. 11.
Figure 34:
FIG. 34 is a top view of the handle cover of FIG. 11.
Figure 35:
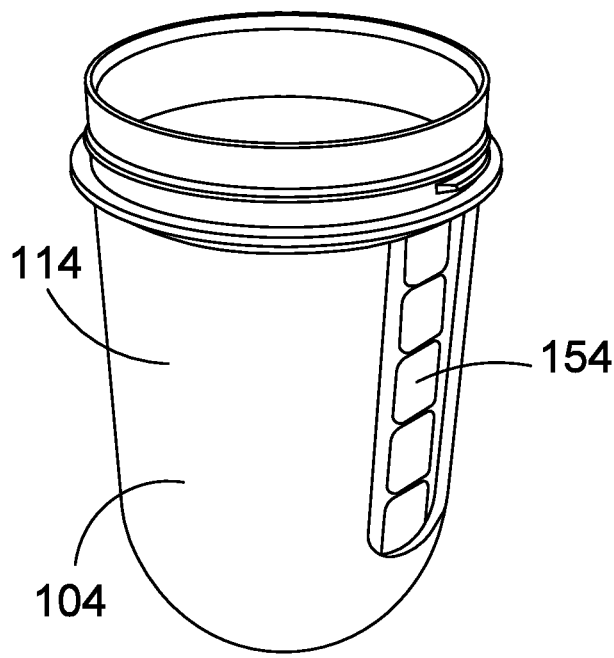
FIG. 35 is a left front perspective view of a further embodiment of the cup.
Figure 37:
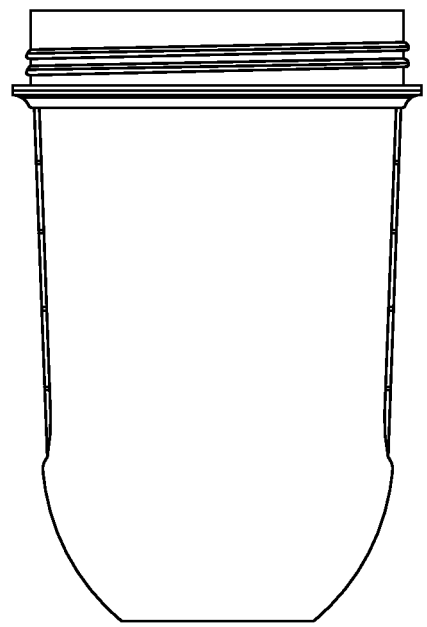
FIG. 37 is a rear view of the cup of FIG. 35.
Figure 36:
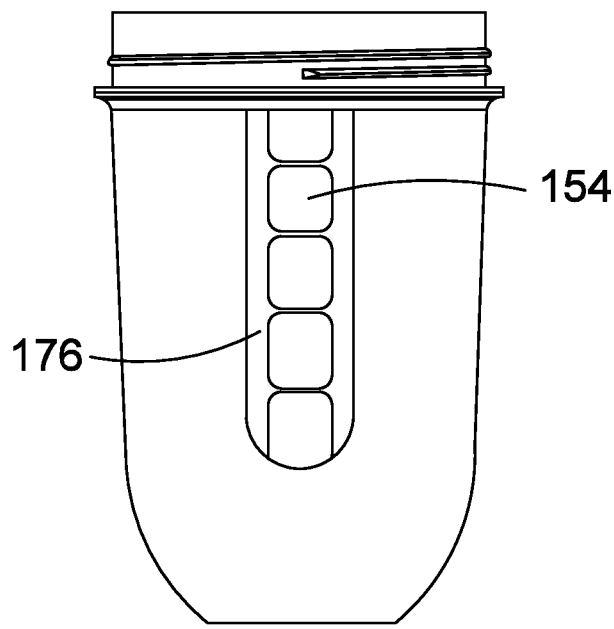
FIG. 36 is a front view of the cup of FIG. 35.
Figure 38:
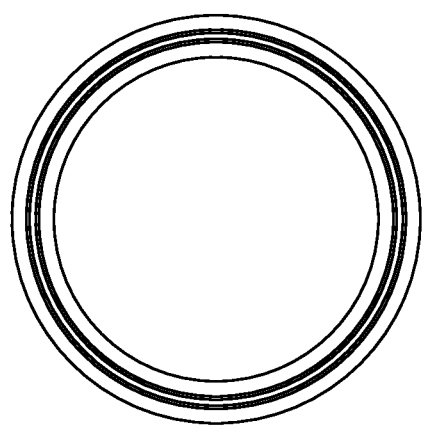
FIG. 38 is a top view of the cup of FIG. 35.
Figure 39:
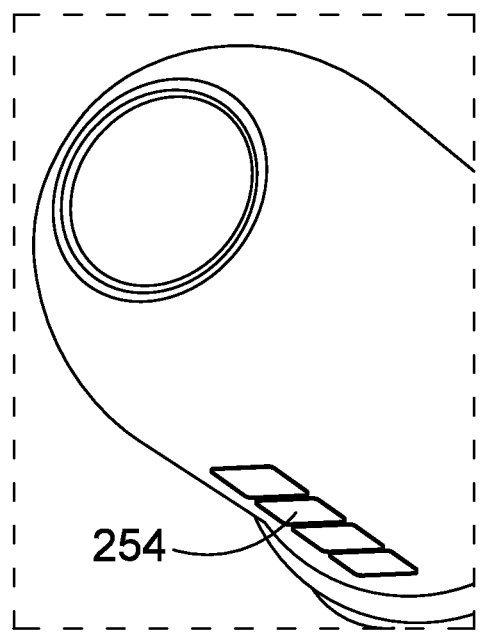
FIG. 39 is a bottom perspective view of a further embodiment the cup.
Figure 41:
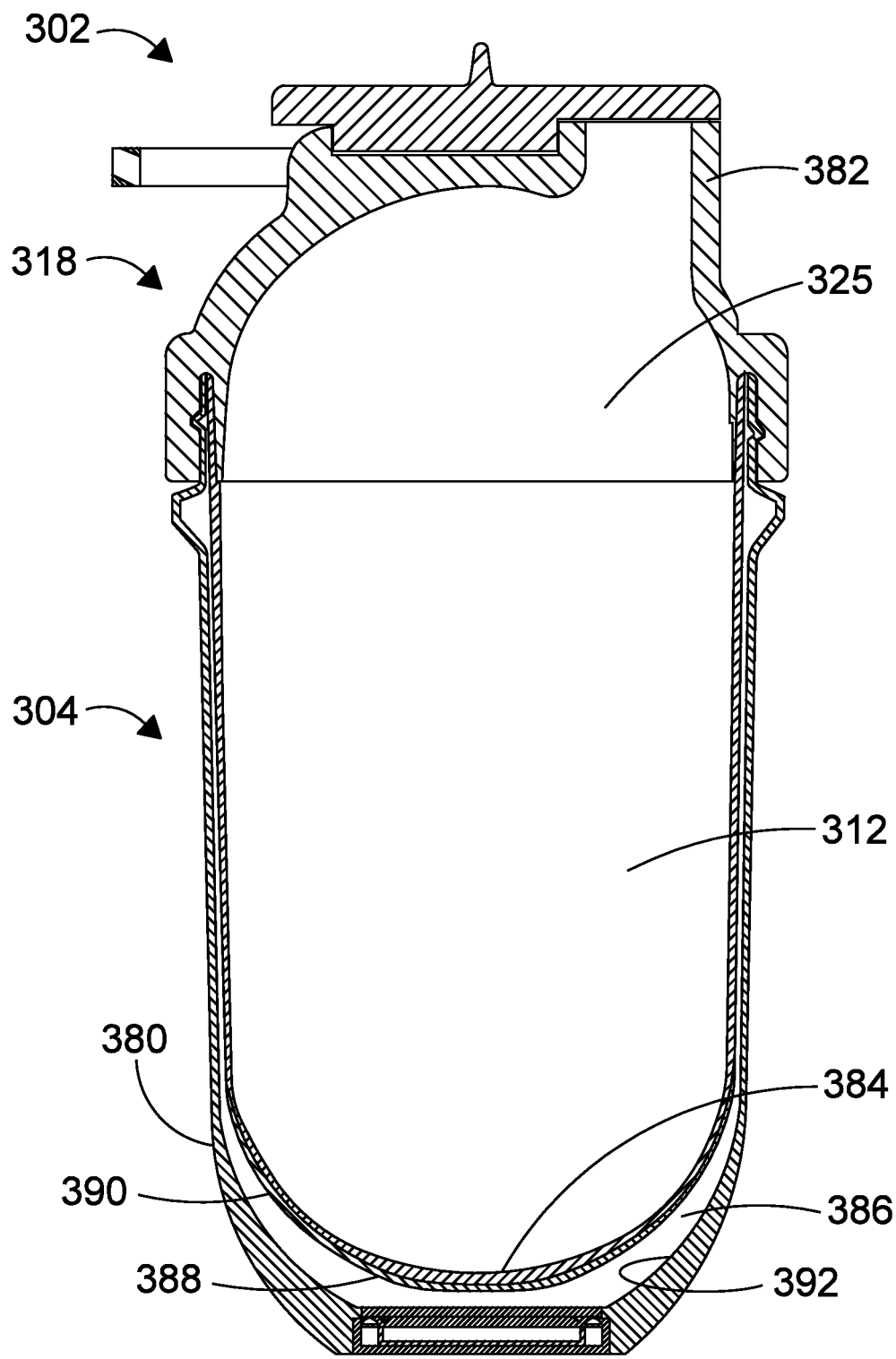
FIG. 41 is a cross-sectional view of an alternate embodiment of the tumbler bottle.
Figure 42:
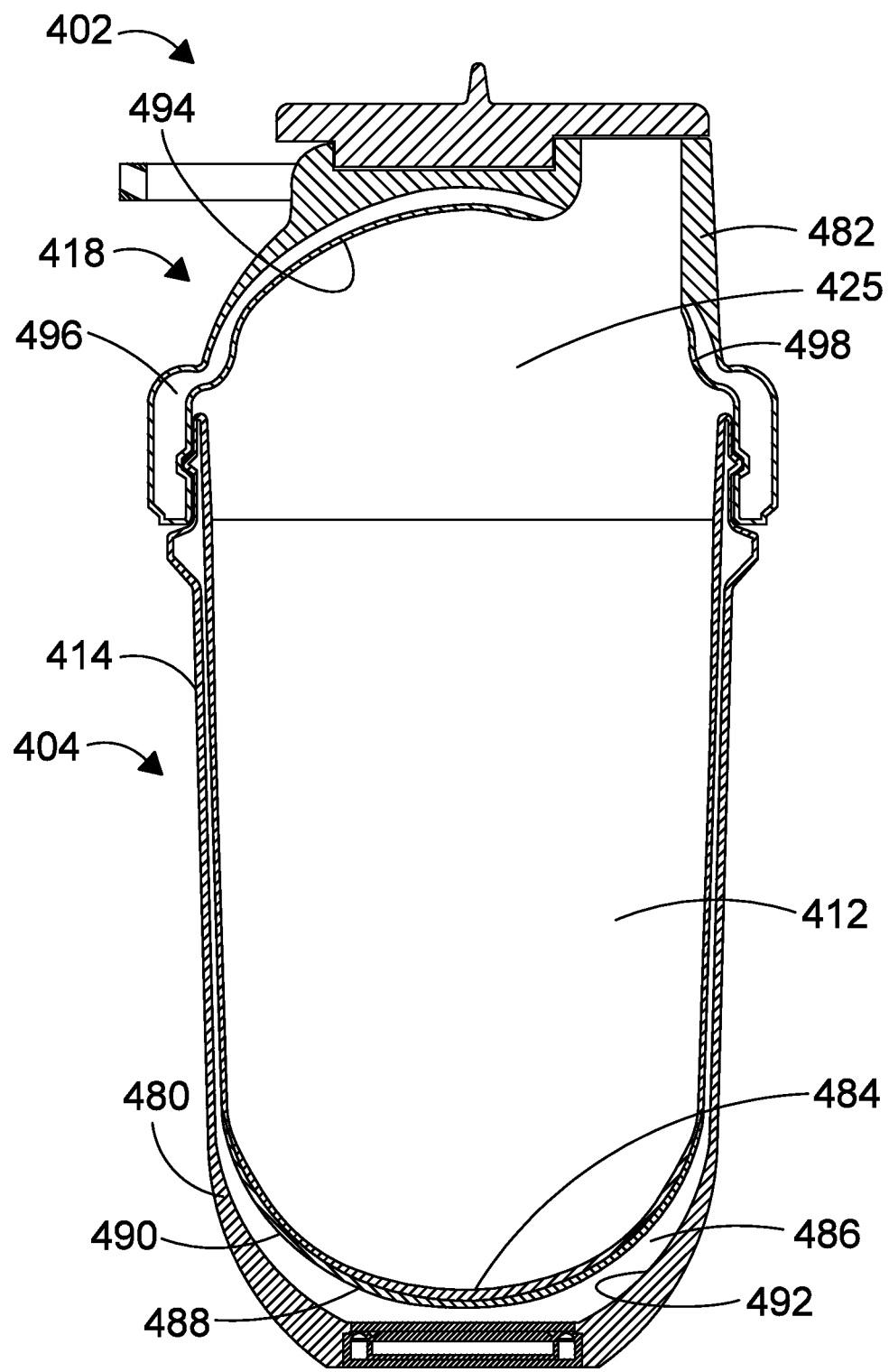
FIG. 42 is a cross-sectional view of a further embodiment of the tumbler bottle.

In the configuration of FIG. 10, the tumbler bottle cup and lid are single walled 180, 182. In the configuration of FIGS. 39-41, the cup 202, 304 is double-walled and the lid 318 is single walled. In the configuration of FIG. 42, both the cup 404 and lid 418 are double walled.

In the configuration of FIG. 41, the tumbler bottle 302 has a cup 304, and lid 318. Cup 304 may be configured as a double walled structure including an exterior wall 380 and an interior wall 384 with an air space 386 arranged between the two walls. The interior wall 384 may be plastic or stainless steel or any other suitable material. The exterior wall 380 may be plastic or stainless steel or any other suitable material. The interior of tumbler 302, including the first mixing chamber 312 and the second mixing chamber 326, has the same interior structure as tumbler 102.

To improve the insulating properties of the tumbler 302, a liner 388 may arranged on a surface 390 of interior wall 384 of the cup 304 between the interior wall 384 and the exterior wall 380 to help maintain the temperature of the tumbler contents. In an alternative (not illustrated), the liner 388 may be arranged on a surface 392 of cup outer wall 380. In a still further alternative (not illustrated), the liner 388 may be arranged on both a surface of interior wall 390 and on a surface 392 of cup outer wall. The liner 388 may be aluminum, copper or other suitable material. The liner 388 may be a single layer of material, or a multilayer laminate structure including one or more layers of at least one of aluminum, copper and other suitable materials.

As illustrated in FIG. 41, lid 318 has the same interior structure as lid 118. In an alternative (not illustrated), lid 318 may have the same structure interior structure as lid 18.

FIG. 42 illustrates a further tumbler bottle configuration. In accordance with the configuration of FIG. 42, the lid 418 may be configured as a double walled structure including an outer wall 482 and an inner wall 494 with an air space 496 arranged between the two walls. The interior wall may be plastic or stainless steel or any other suitable material. The exterior wall may be plastic or stainless steel or any other suitable material. To improve the insulating properties of the lid, a liner 498 may be arranged on a surface 495 of the interior wall of the lid between the interior wall 494 and the exterior wall 482 to help maintain the temperature of the tumbler contents. In an alternative (not illustrated), the liner 498 may be arranged on a surface 483 of lid outer wall 482. In a still further alternative (not illustrated), the liner 498 may be arranged on both a surface 483 of interior wall and a surface 495 of lid outer wall 482.

The lid liner 498 may have the same properties as the cup liner 388.

In the configuration of FIG. 42, cup 404 has the same structure as cup 304. Accordingly, the interior of tumbler 402, including the first mixing chamber 412 and the second mixing chamber 426, has the same interior structure as tumbler 102 and 302.

Figure 43:
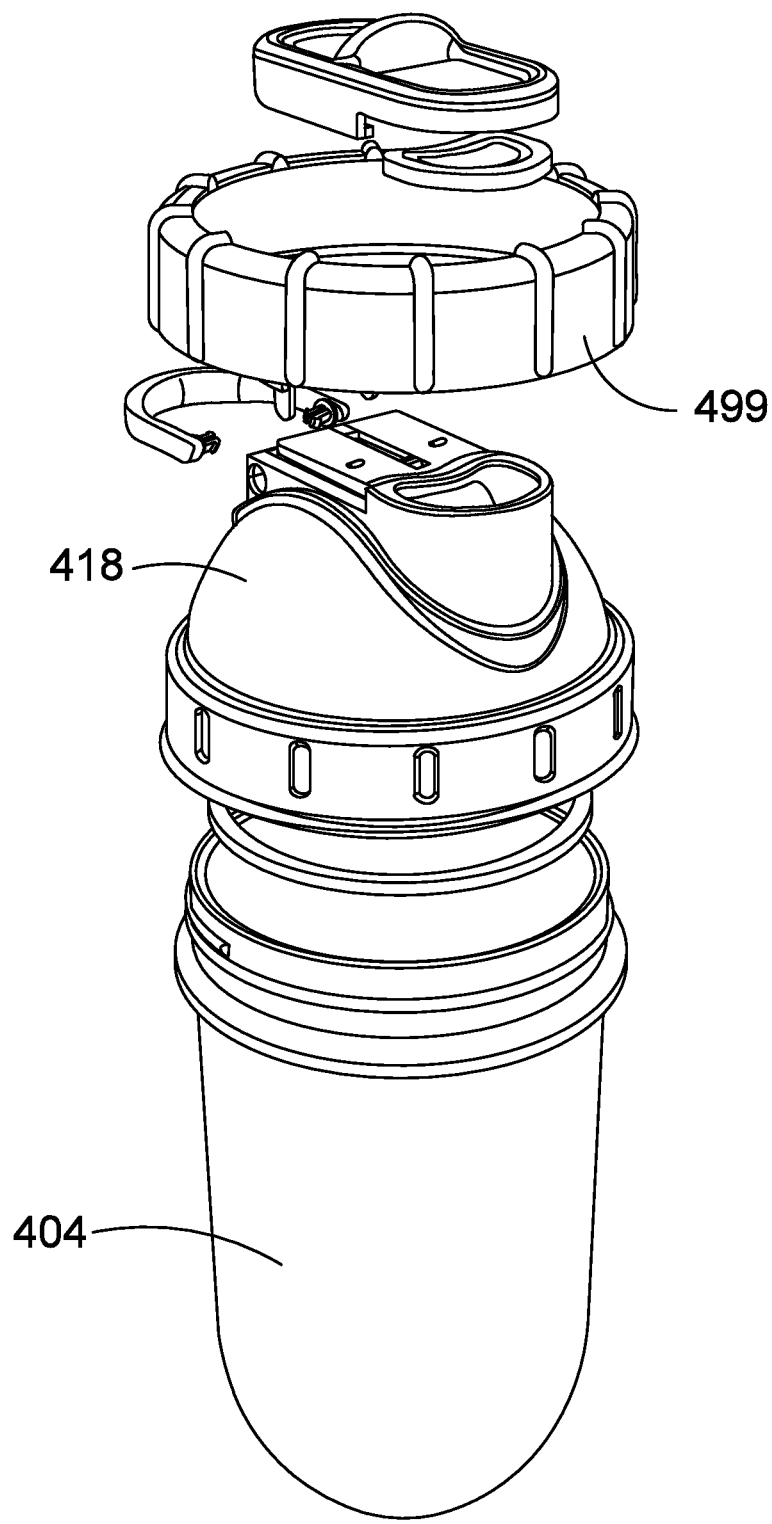
FIG. 43 is an exploded view of alternate embodiment of the tumbler bottle.

In accordance with the configuration of FIGS. 42 and 43, the tumbler bottle assembly may also include a ring 499. Ring 499 is removably coupled to lid 418 by threaded connection. Alternatively, ring 499 may be coupled to lid 418 by a snap fit or other suitable connection. Ring 499 may be configured as a gripping surface. In a further alternative, ring 499 may be configured from a thermal insulating material.

In accordance with various aspects, the cup 102, 202, 302, 402 includes an opening is sized to receive a human hand. Having the cup opening so sized facilitates the ease of cleaning and minimizes the accumulation of slimy residue and smells resulting from the formation of bacteria.

In accordance with various aspects, the diameter of the cup opening may be 70-120 mm, preferably 75-100 mm, and more particularly 84.8 mm wide.

When water and protein powder are quickly shaken within tumbler bottle 2, 102, 202, 303, 402, mixing occurs quickly, without perceptible pauses between the upward and downward motions. Because the tumbler bottle does not have corners, following a shaking action, nearly zero unmixed, wasted solids remain in the bottle, saving money and cleaning time.

According to various aspects, the tumbler bottle can macerate soft fruits following shaking without the need for other structures or devices within the tumbler bottle. Following maceration of the soft fruit, liquids and/or supplements maybe added to the cup and shaken to mix. Again, nearly no solids accumulate.

The inventor has compared the tumbler bottle having the interior configuration of the various embodiments against six competitors to determine waste cost of unmixed solids. As illustrated in Table 1, zero waste product results from the embodiments of the tumbler bottle.

TABLE 1

|  | Protein Powder Before (g) | After (g) (allowing for 3 g of water) | Waste (g) | Waste cost based on standard whey price (pence) | Tub wastage (1 kg tub) (£) |
| --- | --- | --- | --- | --- | --- |
| Tumbler Bottle Example | 132 | 135 | 0 | 0 | 0.00 |
| Mesh grid shaker #1 | 117 | 124 | 4 | 9.6 | 3.19 |
| Mesh grid shaker #2 | 99 | 107 | 5 | 12.1 | 4.03 |
| Wire ball | 106 | 115 | 6 | 14.52 | 4.83 |
| Mesh grid shaker #3 | 178 | 187 | 6 | 14.52 | 4.83 |
| Wire ball stick | 89 | 101 | 9 | 21.78 | 7.25 |
| Mesh grid shaker #4 | 73 | 79 | 3 | 7.26 | 2.41 |

While the present invention has been described with reference to one or more aspects and embodiments, those skilled in the art will recognize that many changes may be made thereto without departing from the spirit and scope of the present invention. Furthermore, components from one embodiment can be used in other non-exclusive embodiments. Each of these embodiments and obvious variations thereof is contemplated as falling within the spirit and scope of the invention.

The invention claimed is:

1. A tumbler bottle, comprising:
   a) a cup having a side wall interior surface and a convex bottom wall interior surface defining a first mixing chamber, said interior surfaces of said cup side and bottom walls being smooth and connected by a smooth transition surface, said cup further including a side wall exterior surface and a bottom wall exterior surface, said bottom wall exterior surface being substantially flat;
   b) a lid removably connected with said cup and including:
      i) a side wall interior surface and a concave top wall interior surface defining a second mixing chamber, said second mixing chamber communicating with said first mixing chamber when said lid is connected with said cup, said interior surfaces of lid side and top walls being smooth and connected by a smooth transition surface;
      ii) at least a portion of one of said lid side wall and said lid top wall including a through opening configured for dispensing contents from the tumbler bottle;
      iii) a platform arranged on an exterior surface of said lid top wall, said platform being adjacent to said through opening, said platform including an integral track and a plurality of notches; and
      iv) a closure connected to said platform and configured for sliding movement relative to said through opening, wherein a lower surface of said closure includes a cavity having a channel configured for receiving said track and a resilient detent arranged in spaced relation within said cavity, said detent configured for cooperating with said notches to lock said closure in a selected position along said platform.

2. The tumbler bottle according to claim 1, wherein said at least one of said first mixing chamber and said second mixing chamber comprises a semi-capsule, semi-ellipsoidal or hemispherical shape.

3. The tumbler bottle according to claim 1, wherein the connection between said cup and said lid has a smooth interior transition surface.

4. The tumbler bottle according to claim 1, wherein said cup includes an opening sized to receive a human hand.

5. The tumbler bottle according to claim 1 and further comprising a ring configured for removable coupling to said lid.

6. The tumbler bottle according to claim 5, wherein the ring is configured from a temperature insulating material.

7. The tumbler bottle according to claim 5, wherein said ring covers an exterior transition surface between said lid and said cup when said lid is connected with said cup.

8. The tumbler bottle according to claim 1 and further comprising a lining.

9. The tumbler bottle according to claim 8, wherein said lining is copper.

10. The tumbler bottle according to claim 8, wherein said cup comprises an exterior wall and an interior wall, said exterior wall and said interior wall being separated by an air gap.

11. The tumbler bottle according to claim 10, wherein said lining is arranged between said interior wall and said exterior wall.

12. The tumbler bottle according to claim 10, wherein at least one of said cup exterior wall and interior wall comprises stainless steel.

13. The tumbler bottle according to claim 11, wherein said lining is bonded to said cup interior wall.

14. The tumbler bottle according to claim 8, wherein said lid comprises an exterior wall and an interior wall, said exterior wall and said interior wall being separated by an air gap.

15. The tumbler bottle according to claim 14, wherein said lining is arranged between said lid exterior wall and said lid interior wall.

16. The tumbler bottle according to claim 14, wherein at least one of said lid exterior wall and interior wall comprise stainless steel.

17. The tumbler bottle according to claim 15, wherein said lining is bonded to said lid interior wall.

18. The tumbler bottle according to claim 1, wherein said cup includes graduated measurement indicia.

19. The tumbler bottle according to claim 18 and further comprising a window arranged on a side wall of said cup, said window including said measurement indicia.

20. A tumbler bottle, comprising:
a) a cup having a side wall interior surface and a bottom wall interior surface having a hemispherical configuration defining a first mixing chamber, said interior surfaces of said cup side and bottom walls being smooth and connected by a smooth transition surface, said cup further including a side wall exterior surface and a bottom wall exterior surface, said bottom wall exterior surface being configured for maintaining said cup in an upright configuration, and
b) a lid removably connected with said cup and including:
  i) a side wall interior surface and a top wall interior surface having a hemispherical configuration defining a second mixing chamber, said second mixing chamber communicating with said first mixing chamber when said lid is connected with said cup, said interior surfaces of lid side and top walls being smooth and connected by a smooth transition surface;
  ii) at least a portion of one of said lid side wall and said lid top wall including a through opening configured for dispensing contents from the unitary chamber; and
  iii) a closure for said through opening;
wherein when said lid is connected with said cup, said lid top wall inner surface, said cup bottom wall inner surface, and said lid and cup side wall inner surfaces define an inner chamber having a capsule configuration being one of an ellipsoidal or spherical shape, the connection between said cup and said lid having a smooth interior transition surface.

* * * * *